US008811154B2

(12) United States Patent
Kubota

(10) Patent No.: US 8,811,154 B2
(45) Date of Patent: Aug. 19, 2014

(54) PACKET FORWARDING SYSTEM, PACKET FORWARDING DEVICE, PROXY DEVICE, COMPUTER READABLE MEDIUM STORING PROGRAM, AND CONTROL METHOD OF PACKET FORWARDING DEVICE

(75) Inventor: Kazushi Kubota, Tokyo (JP)

(73) Assignee: NEC Corporation, Tokyo (JP)

( * ) Notice: Subject to any disclaimer, the term of this patent is extended or adjusted under 35 U.S.C. 154(b) by 487 days.

(21) Appl. No.: 12/687,739

(22) Filed: Jan. 14, 2010

(65) Prior Publication Data
US 2010/0182926 A1 Jul. 22, 2010

(30) Foreign Application Priority Data

Jan. 20, 2009 (JP) ................................. 2009-009492

(51) Int. Cl.
*G01R 31/08* (2006.01)
*H04L 12/56* (2006.01)
*H04W 40/00* (2009.01)
*H04W 84/20* (2009.01)
*H04L 12/26* (2006.01)
*H04W 24/08* (2009.01)
*H04W 40/04* (2009.01)

(52) U.S. Cl.
CPC ............... *H04L 45/58* (2013.01); *H04L 45/22* (2013.01); *H04L 45/44* (2013.01); *H04L 45/60* (2013.01); *H04L 45/70* (2013.01); *H04L 45/583* (2013.01); *H04L 45/586* (2013.01); *H04L 45/28* (2013.01); *H04L 43/10* (2013.01); *H04L 47/122* (2013.01); *H04L 47/125* (2013.01); *H04L 49/15* (2013.01); *H04L 49/501* (2013.01); *H04L 49/505* (2013.01); *H04W 24/08* (2013.01); *H04W 40/005* (2013.01); *H04W 40/04* (2013.01); *H04W 84/20* (2013.01)
USPC ....................................................... 370/219

(58) Field of Classification Search
CPC ......... H04L 43/10; H04L 45/22; H04L 45/44; H04L 45/58; H04L 45/60; H04L 45/70; H04L 45/583; H04L 45/586; H04L 45/28; H04L 47/122; H04L 47/125; H04L 49/15; H04L 49/501; H04L 49/505; H04W 24/08; H04W 40/005; H04W 40/04; H04W 84/20
USPC ......... 370/217–221, 232, 225, 228, 384, 422, 370/426
See application file for complete search history.

(56) References Cited

U.S. PATENT DOCUMENTS 6,856,591 B1 * 2/2005 Ma et al. ....................... 370/216
6,973,027 B1 * 12/2005 Shaffer et al. ................. 370/218

(Continued)

FOREIGN PATENT DOCUMENTS

JP 2004266819 A 9/2004
JP 2006310976 A 11/2006

(Continued)

OTHER PUBLICATIONS

Japanese Office Action for JP2009-009492 mailed on Jun. 26, 2012.

*Primary Examiner* — Mark Rinehart
*Assistant Examiner* — Peter Cheng
(74) *Attorney, Agent, or Firm* — Sughrue Mion, PLLC

(57) ABSTRACT

A first packet forwarding device is able to form a redundancy group with another packet forwarding device, and is configured to switch master and backup operation with the another packet forwarding device in a complementary manner. The first packet forwarding device is further configured to switch a first operation mode and a second operation mode in the backup operation, the first operation mode monitoring a control packet transmitted regarding the redundancy group from the another packet forwarding device that performs the master operation, and the second operation mode not monitoring the control packet. A proxy device is configured to monitor the control packet on behalf of the first packet forwarding device when the first packet forwarding device is in the second operation mode, and to control switching between the first and second operation modes of the first packet forwarding device based on monitor result of the control packet.

19 Claims, 18 Drawing Sheets

(56) References Cited

U.S. PATENT DOCUMENTS

2004/0060066 A1* 3/2004 Seki et al. .................. 725/80
2007/0153765 A1* 7/2007 Lei et al. ..................... 370/351
2007/0201426 A1* 8/2007 Shinohara et al. ........... 370/351
2008/0225699 A1* 9/2008 Lee ............................ 370/218

FOREIGN PATENT DOCUMENTS

| JP | 2007228490 A | 9/2007 |
| JP | 2007318263 A | 12/2007 |
| JP | 2009088735 A | 4/2009 |
| JP | 20009212798 A | 9/2009 |

* cited by examiner

PACKET FORWARDING SYSTEM, PACKET FORWARDING DEVICE, PROXY DEVICE, COMPUTER READABLE MEDIUM STORING PROGRAM, AND CONTROL METHOD OF PACKET FORWARDING DEVICE

INCORPORATION BY REFERENCE

This application is based upon and claims the benefit of priority from Japanese patent application No. 2009-009492, filed on Jan. 20, 2009, the disclosure of which is incorporated herein in its entirety by reference.

BACKGROUND OF THE INVENTION

1. Technical Field

The present invention relates to a forwarding system that includes a plurality of packet forwarding devices forming a redundant group based on a redundancy protocol such as a VRRP (Virtual Router Redundancy Protocol) or the like. More specifically, the present invention relates to controlling of operation mode of a packet forwarding device in backup operation.

2. Background Art

A VRRP is a protocol to achieve redundancy of routers that perform IP (Internet Protocol) packet forwarding (see Japanese Unexamined Patent Application Publication Nos. 2004-266819, 2006-310976 and 2007-318263, for example). Routers that support the VRRP form a redundancy group called VRRP group, and behave as one virtual router. In the VRRP group, one router functions as an active system router (called master router) that performs packet forwarding, and other routers function as standby system routers (called backup routers).

In the event of a failure occurrence in the master router, the backup router turns into a master router and takes over IP packet forwarding processing. The backup router should constantly perform standby operation so as to be able to take over the IP packet forwarding processing as soon as the failure occurs in the master router. In summary, the backup router constantly monitors the control packet (more specifically VRRP advertisement) periodically transmitted by the master router, and turns into the master router when the VRRP advertisement cannot normally be received.

As stated above, the backup router must constantly monitor the VRRP packets. Further, in order to promptly take over the processing of the master router, hot standby is required to operate a plurality of communication ports, a packet forwarding function unit, a control unit that performs updating of a routing table and an ARP table or the like in a conduction state. However, a case may also be considered in which important communication is rarely occurred in a certain time period (nighttime, for example) depending on the environments where the routers are used. As the backup router constantly performs hot standby in the VRRP, it is difficult to reduce power consumption.

Note that the above-mentioned problem is not limited to the VRRP and routers forwarding the IP packet. It is a typical problem when employing a redundancy protocol in which a plurality of packet forwarding devices form a redundancy group and transmission of a control packet by one packet forwarding device that performs active system operation (master operation) controls switching of another packet forwarding device that performs standby system operation (backup operation) to the active system operation.

SUMMARY

The present invention has been made in view of the above-described problem. An exemplary object of the present invention is to reduce power consumption of a packet forwarding device that supports redundancy protocol such as VRRP and performs standby system operation (backup operation).

A first exemplary aspect of the invention is a packet forwarding system including a first packet forwarding device and a proxy device. The first packet forwarding device is able to form a redundancy group with another packet forwarding device, and is configured to switch master operation and backup operation with the another packet forwarding device in a complementary manner. Further, the first picket forwarding device is configured to switch a first operation mode and a second operation mode, the first operation mode monitoring a control packet transmitted regarding the redundancy group from the another packet forwarding device that performs the master operation in the backup operation, and the second operation mode not monitoring the control packet in the backup operation. The proxy device is configured to monitor the control packet on behalf of the first packet forwarding device when the first packet forwarding device is in the second operation mode, and to control switching between the first and second operation modes of the first packet forwarding device based on monitor result of the control packet.

A second exemplary aspect of the invention is a packet forwarding device including a forwarding unit and a forward controlling unit. The forwarding unit is configured to forward a data packet between at least two communication ports. The forward controlling unit forms a redundancy group with another device, and is configured to switch master operation and backup operation of the forwarding unit with the another device in a complementary manner. The forward controlling unit is further configured to switch a first operation mode and a second operation mode based on control through a network by a proxy device that is capable of monitoring a control packet transmitted regarding the redundancy group from the another device that performs the master operation, the first operation mode monitoring the control packet in the backup operation, and the second operation mode not monitoring the control packet in the backup operation.

A third exemplary aspect of the invention is a proxy device including a communication unit and a proxy monitoring unit. The communication unit is capable of being connected to a network that can reach first and second packet forwarding devices, the first and second packet forwarding devices forming a redundancy group and switching master operation and backup operation in a complementary manner. Further, the proxy monitoring unit monitors a control packet transmitted from the second packet forwarding device that performs the master operation regarding the redundancy group through the communication unit, and controls switching between first and second operation modes of the first packet forwarding device based on the monitoring. Now, the first operation mode is an operation mode in which the first packet forwarding device monitors the control packet in the backup operation. The second operation mode is an operation mode in which the first packet forwarding device does not monitor the control packet in the backup operation.

A fourth exemplary aspect of the invention is a program to cause a computer to execute control processing regarding a first packet forwarding device. The first packet forwarding device forms a redundancy group with a second packet forwarding device, and is configured to perform switch of master operation and backup operation with the second packet forwarding device in a complementary manner. The control processing executed by the computer based on the program includes switching operation mode of the first packet forwarding device between a first operation mode and a second operation mode based on control through a network by a proxy device that is capable of monitoring a control packet transmitted regarding the redundancy group from the second packet forwarding device that performs the master operation, the first operation mode monitoring the control packet when the first packet forwarding device performs the backup operation, and the second operation mode not monitoring the control packet when the first packet forwarding device performs the backup operation.

A fifth exemplary aspect of the invention is a program for causing a computer to execute control processing. The computer includes a communication unit that is connected to a network that can reach first and second packet forwarding devices, the first and second packet forwarding devices forming a redundancy group and switching master operation and backup operation in a complementary manner.

The control processing executed by the computer based on the program includes (a) monitoring a control packet transmitted regarding the redundancy group from the second packet forwarding device that performs the master operation through the communication unit, and (b) controlling switching of the first packet forwarding device between first and second operation modes based on the monitoring.

The first operation mode is an operation mode in which the first packet forwarding device monitors the control packet in the backup operation. The second operation mode is an operation mode in which the first packet forwarding device does not monitor the control packet in the backup operation.

A sixth exemplary aspect of the invention is A control method of first and second packet forwarding devices that form a redundancy group and switch master operation and backup operation in a complementary manner. This control method includes switching operation mode of the first packet forwarding device between a first operation mode and a second operation mode based on control through a network by a proxy device that monitors a control packet transmitted regarding the redundancy group from the second packet forwarding device that performs the master operation, the first operation mode monitoring the control packet while the first packet forwarding device is in backup operation, and the second operation mode not monitoring the control packet while the first packet forwarding device is in the backup operation.

A seventh exemplary aspect of the invention is A control method of first and second packet forwarding devices that form a redundancy group and switch master operation and backup operation in a complementary manner. This control method includes (a) monitoring a control packet transmitted from the second packet forwarding device that performs the master operation regarding the redundancy group, and (b) controlling switching of the first packet forwarding device between first and second operation modes based on the monitoring.

The first operation mode is an operation mode in which the first packet forwarding device monitors the control packet in the backup operation. The second operation mode is an operation mode in which the first packet forwarding device does not monitor the control packet in the backup operation.

BRIEF DESCRIPTION OF THE DRAWINGS

The above and other aspects, features, and advantages of the present invention will become more apparent from the following description of certain exemplary embodiments when taken in conjunction with the accompanying drawings, in which.

EXEMPLARY EMBODIMENT

Hereinafter, the specific exemplary embodiments to which the present invention is applied will be described in detail with reference to the drawings. Throughout the drawings, the same components are denoted by the same reference symbols, and the overlapping description will be omitted as appropriate for the sake of clarity of description.

First Exemplary Embodiment

Figure 1:
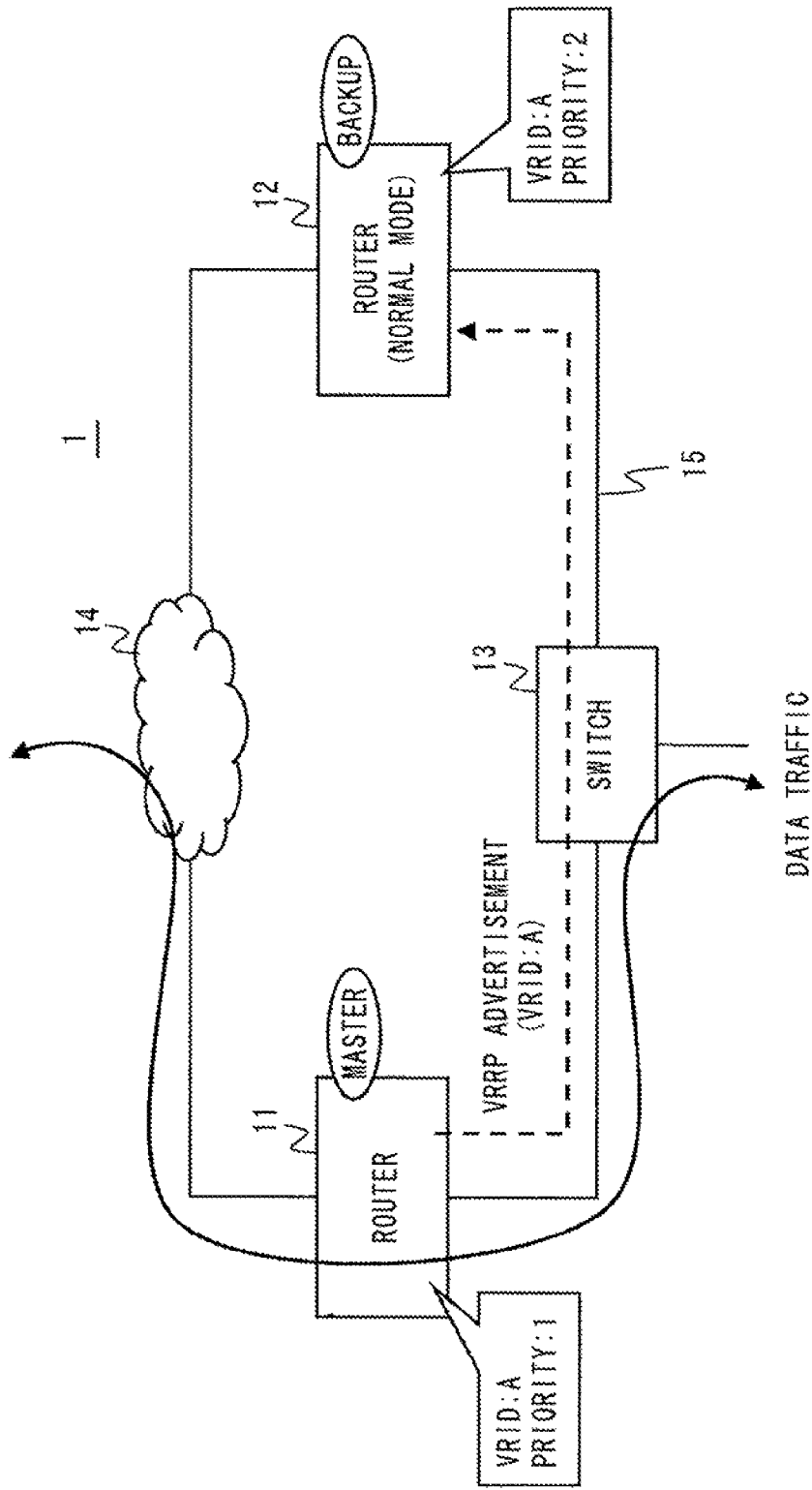
FIG. 1 is a configuration diagram of a packet forwarding system according to a first exemplary embodiment of the present invention.

FIG. 1 is a diagram showing a configuration example of a packet forwarding system 1 according to the first exemplary embodiment of the present invention. The packet forwarding system 1 includes routers 11 and 12 that support VRRP, and a switch 13. The routers 11 and 12 form a VRRP group, and execute master router (active system) operation and backup router (standby system) operation in a complementary manner. One of the routers 11 and 12 that performs master router operation relays IP packets between a network 14 and a network 15 to which the switch 13 is connected, and the other router performs backup operation.

In the example of FIG. 1, the routers 11 and 12 belong to a VRRP group whose VRID (virtual router identifier) is "A". The VRID is an identifier of the VRRP group. Further, in the example of FIG. 1, priority "1" is given to the router 11, and priority "2" is given to the router 12. In this specification, a router whose priority value is the smallest preferentially works as a master router and other routers work as backup routers. In short, in the example of FIG. 1, the router 11 performs the master router operation in preference to the router 12. Note that whether to perform changeback from the low prioritized router 12 to the high prioritized router 11 (presence or absence of preempt mode) can be arbitrarily determined.

Further, the router 12 is able to switch an operation mode that monitors a control packet transmitted from the router 11, which is a VRRP advertisement, (hereinafter referred to as normal mode) and an operation mode that does not monitor the control packet (hereinafter referred to as power saving mode) while the other router 11 operates as the master router.

The switch 13 is connected to the network 15 that can reach the routers 11 and 12. The switch 13 is a communication device that performs data forwarding processing in a lower layer than the routers 11 and 12 that perform packet forwarding processing in an IP layer. Further, the switch 13 includes a function of monitoring the VRRP advertisement which should be normally executed by the router 12 on behalf of the router 12.

Hereinafter, the outline will be described of operation mode switching of the router 12 executed by the cooperation of the router 12 and the switch 13 with reference to FIGS. 1 to 4. FIG. 1 shows a case in which the router 12 is in a normal mode. The router 12 in the normal mode receives and monitors the VRRP advertisement transmitted from the router 11 that performs the master router operation, and itself turns into a master router upon detection of reception abnormality of the VRRP advertisement. Note that the condition for the backup router to turn into the master router may be defined according to the regulation of the VRRP. For example, the backup router may turn into the master router when receiving no VRRP advertisement within the time which is three times as long as the VRRP advertisement timer.

Figure 2:
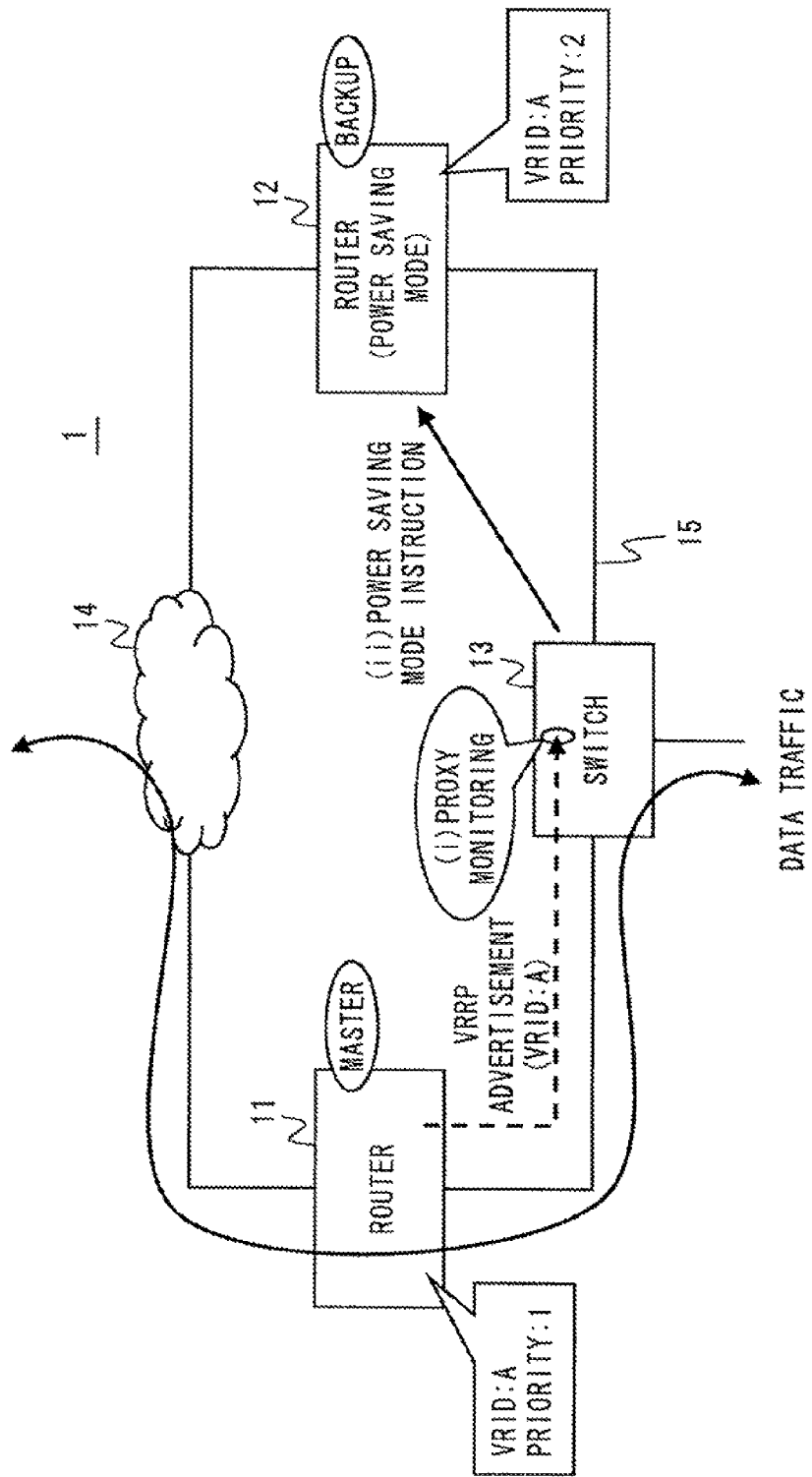
FIG. 2 is a diagram showing switch to a power saving mode of the packet forwarding system according to the first exemplary embodiment of the present invention.

FIG. 2 is a diagram showing a transition state from the normal mode to the power saving mode. The switch 13 starts proxy monitoring of the VRRP advertisement transmitted from the master router 11, and at the same time, instructs the router 12 to make a transition to the power saving mode. Upon receiving the instruction from the switch 13, the router 12 makes a transition to the power saving mode in which the monitoring of the VRRP advertisement is not performed, or cold standby state.

The condition of switching the normal mode to the power saving mode is not particularly limited. For example, specific time period or specific period such as nighttime, weekend, leave may be set as a period in which the backup router should be switched to the power saving mode in advance. In this case, the switch 13 may instruct the router 12 to make a transition to the power saving mode when the set time period or period comes. Further, the transition from the normal mode to the power saving mode may be judged depending on the data traffic amount (more specifically, amount of forwarded packets) that should be processed by the routers 11 and 12 that belong to the same VRRP group. For example, the switch 13 may monitor the data traffic amount, and when the traffic statistics is below a predetermined threshold value, instruct the router 12 to make a transition to the power saving mode.

In the example of FIG. 2, the switch 13 judges the timing of switching from the normal mode to the power saving mode. However, this judgment may be performed by the router 12 itself whose mode is changed into the power saving mode. In such a case, the router 12 may transmit the control packet to request proxy monitoring of the VRRP advertisement to the switch 13 when the mode is changed to the power saving mode.

Figure 3:
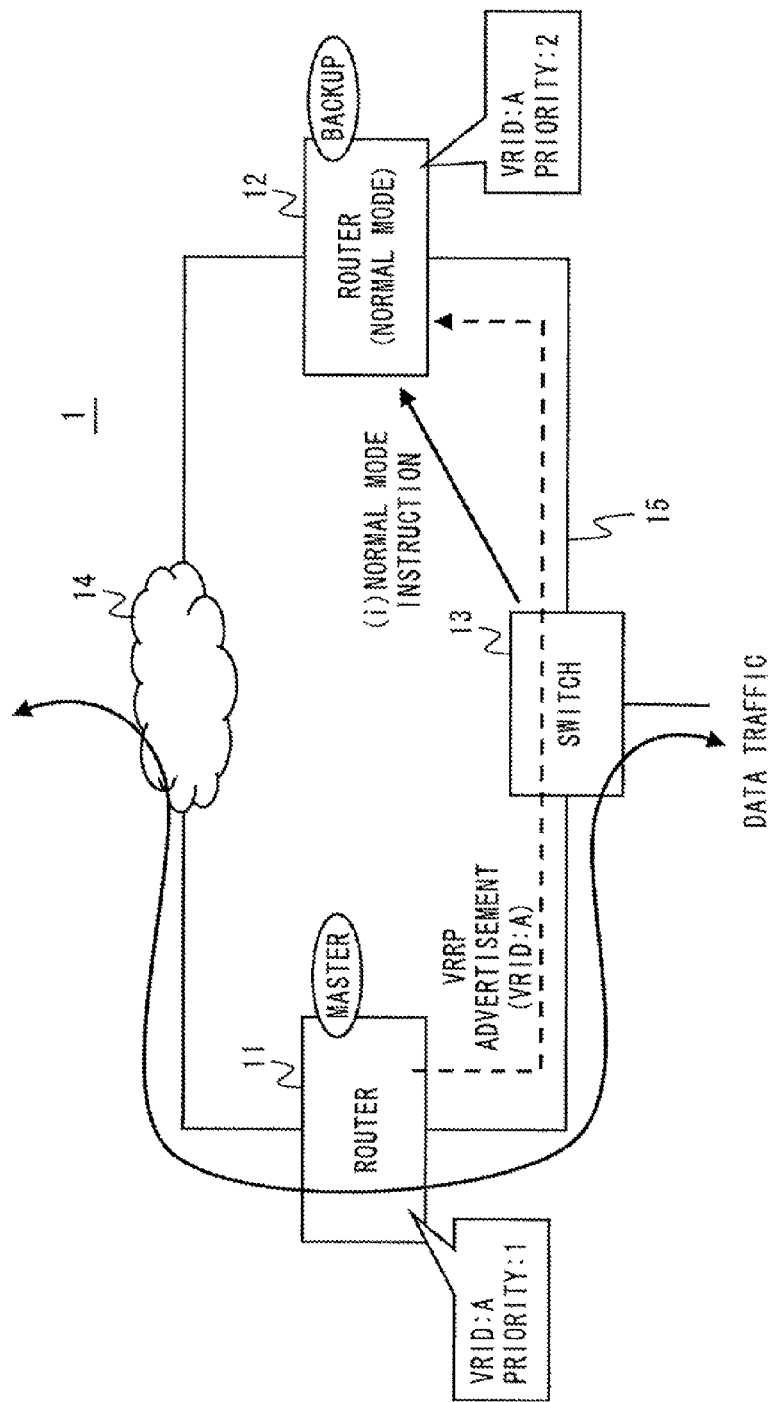
FIG. 3 is a diagram showing switch to a normal mode of the packet forwarding system according to the first exemplary embodiment of the present invention.

FIG. 3 is a diagram showing a transition sate from the power saving mode to the normal mode. The switch 13 instructs the router 12 to make a transition to the normal mode upon judgment of establishment of the predetermined condition. The condition of switching from the power saving mode to the normal mode is not particularly limited but can be determined in accordance with the condition of switching the mode from the normal mode to the power saving mode as stated above. For example, the switch 13 may instruct the router 12 to make a transition to the normal mode upon termination of the period that should be in the power saving mode. Alternatively, the switch 13 may monitor the traffic amount, and instruct the router 12 to make a transition to the normal mode when the traffic statistics exceeds the predetermined threshold value.

In the example of FIG. 3, the switch 13 judges the timing of switching from the power saving mode to the normal mode. However, this judgment may be performed by the router 12 itself in which the mode is changed to the normal mode. In such a case, when the mode is changed to the normal mode, the router 12 may transmit to the switch 13 the control packet indicating the recovery to the normal mode.

Figure 4:
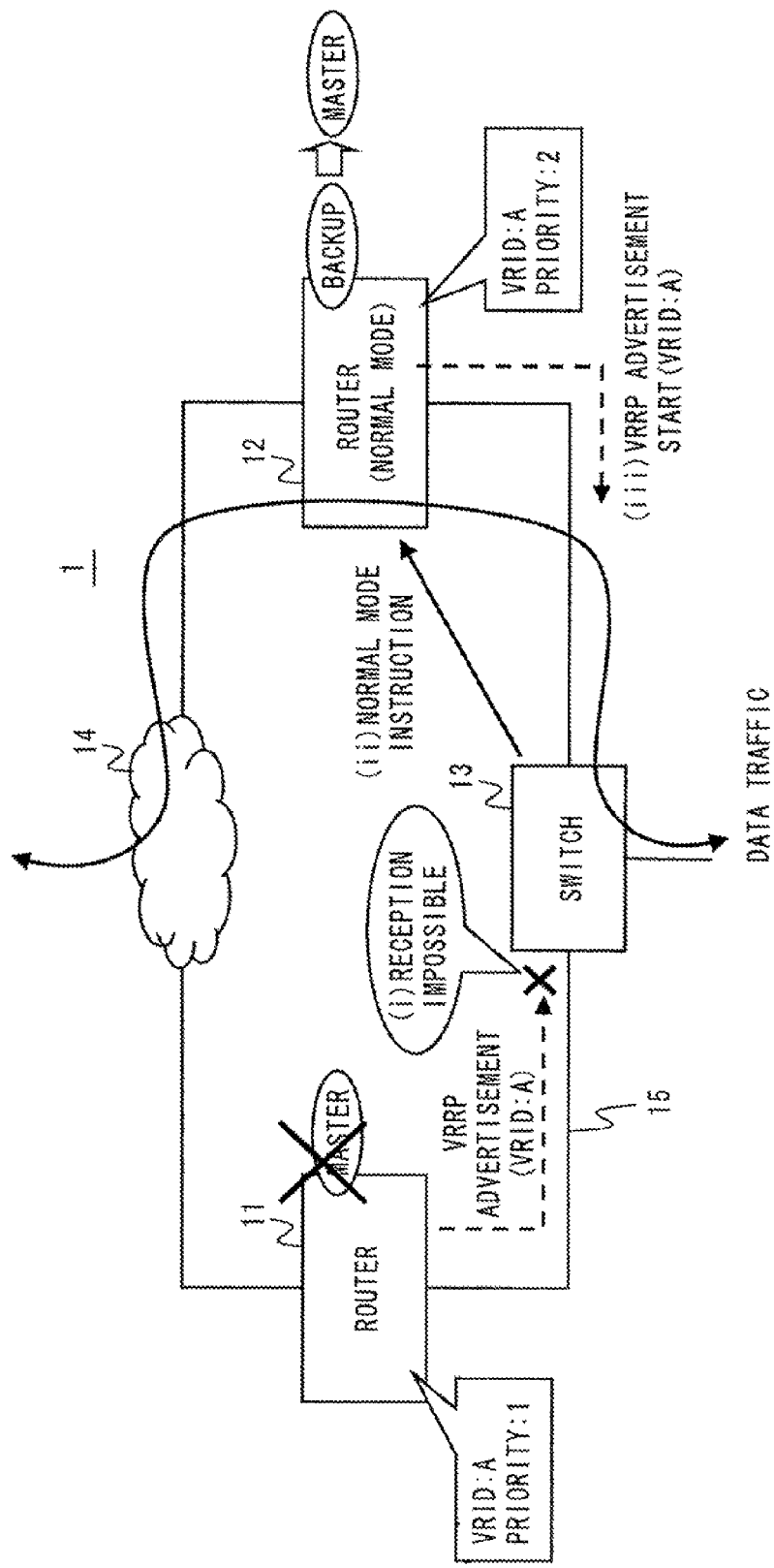
FIG. 4 is a diagram showing switch to the normal mode of the packet forwarding system according to the first exemplary embodiment of the present invention.

FIG. 4 shows a case in which the router 12 changes from the power saving mode to the normal mode in the event of a failure occurrence in the router 11 which is the master router. The switch 13, which performs proxy monitoring of the VRRP advertisement, detects the failure of the router 11 based on the state of receiving the VRRP advertisement transmitted by the master router 11, and instructs the recovery to the normal mode to the router 12. For example, the switch 13 may instruct the recovery to the normal mode when receiving no VRRP advertisement within the time which is three times as long as the VRRP advertisement timer according to the regulation of VRRP. Alternatively, in consideration of the time required for the router 12 to recover to the normal mode, the switch 13 may instruct the recovery to the normal mode when receiving no VRRP advertisement within the time which is shorter than the time regulated in the VRRP (time which is twice as long as the VRRP advertisement timer, for example). Accordingly, the router 12 may start the recovery processing to the normal mode as soon as possible, thereby reducing the time required to switch the master router. In the example of FIG. 4, the router 12 that receives the instruction to make a transition to the normal mode recovers to the normal mode. As the router 12 that recovers to the normal mode cannot receive the VRRP advertisement from the router 11, the router 12 changes the operation from the backup router operation to the master router operation.

Note that the transition instruction to the normal mode that is transmitted from the switch 13 to the router 12 may include information that is able to discriminate the instruction in the normal state shown in FIG. 3 from the instruction in the event of the failure occurrence shown in FIG. 4. In this case, the router 12 that receives the instruction in the event of the failure occurrence should immediately recover as the master router, instead of once recovering to the normal mode as the backup router. Thus, the transition from the power saving mode, which is the cold standby state, to the master router operation can be promptly performed.

Figure 5:
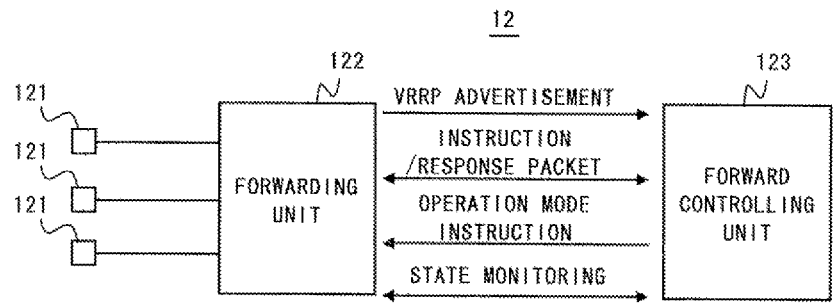
FIG. 5 is a block diagram showing a configuration example of a router 12 shown in FIG. 1.

In the following description, the configuration example and the operation of the router 12 and the switch 13 will be described. FIG. 5 is a block diagram showing the configuration example of the router 12. A forwarding unit 122 relays IP packets between a plurality of communication ports 121. A forward controlling unit 123 monitors the control packet (VRRP advertisement) regarding the VRRP group received by the forwarding unit 122, and executes control regarding the VRRP such as switch of the master router operation and the backup router operation. Further, the forward controlling unit 123 performs communication with the switch 13 that performs proxy monitoring of the VRRP advertisement, and performs switch control between the normal mode and the power saving mode.

Figure 7:
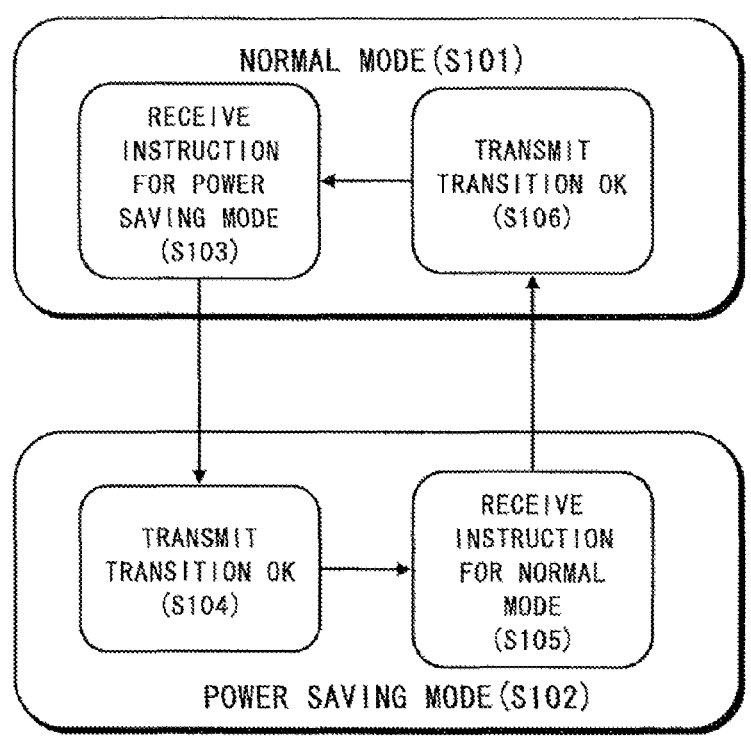
FIG. 7 is a state transition diagram regarding the router 12 shown in FIG. 1.

FIG. 7 is a diagram showing a specific example of the state transition of the router 12. The router 12 performs state transition between the normal mode (S101) and the power saving mode (S102). As described above, the power saving mode is the operation mode that does not perform monitoring of the VRRP advertisement as the backup router or packet forwarding processing as the master router. The router 12 that operates in the power saving mode may operate with a minimum power that is able to receive the transition instruction to the normal mode from the switch 13 and to start the operation to make a transition to the normal mode.

The router 12 that operates in the normal mode makes a transition to the power saving mode upon receiving the instruction to make a transition to the power saving mode (S103). Upon completion of transition to the power saving mode, the router 12 notifies the switch 13 of the transition completion to the power saving mode (S104). The router 12 that operates in the power saving mode makes a transition to the normal mode upon receiving the transition instruction to the normal mode (S105). Upon completion of transition to the normal mode, the router 12 notifies the switch 13 of the completion of transition to the normal mode (S106). Note that the state transition shown in FIG. 7 is merely one example. As mentioned above, the transition from the normal mode to the power saving mode and vice versa may be judged by the router 12 itself without depending on the instruction from the switch 13 except a case in which the failure occurs in the master router in proxy monitoring.

Figure 6:
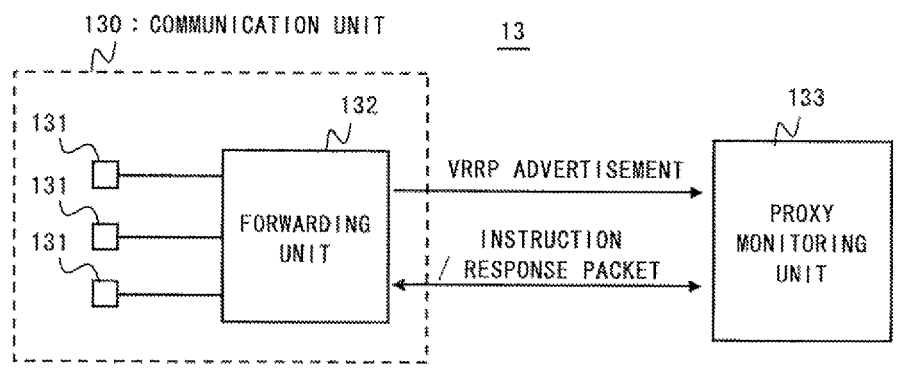
FIG. 6 is a block diagram showing a configuration example of a switch 13 shown in FIG. 1.

FIG. 6 is a block diagram showing the configuration example of the switch 13. A communication unit 130 is connected to the network 15 that can reach the routers 12 and 13 that switch the master operation and the backup operation in a complementary manner by forming one VRRP group. The communication unit 130 includes a plurality of communication ports 131 to which the network 15 and communication lines between other hosts are connected. A forwarding unit 132 forwards communication data (MAC (Media Access Control) frame or the like) between the plurality of communication ports 131. A proxy monitoring unit 133 executes proxy monitoring of the VRRP advertisement, and transmits the control packet to instruct the router 12 to switch the operation mode.

Figure 8:
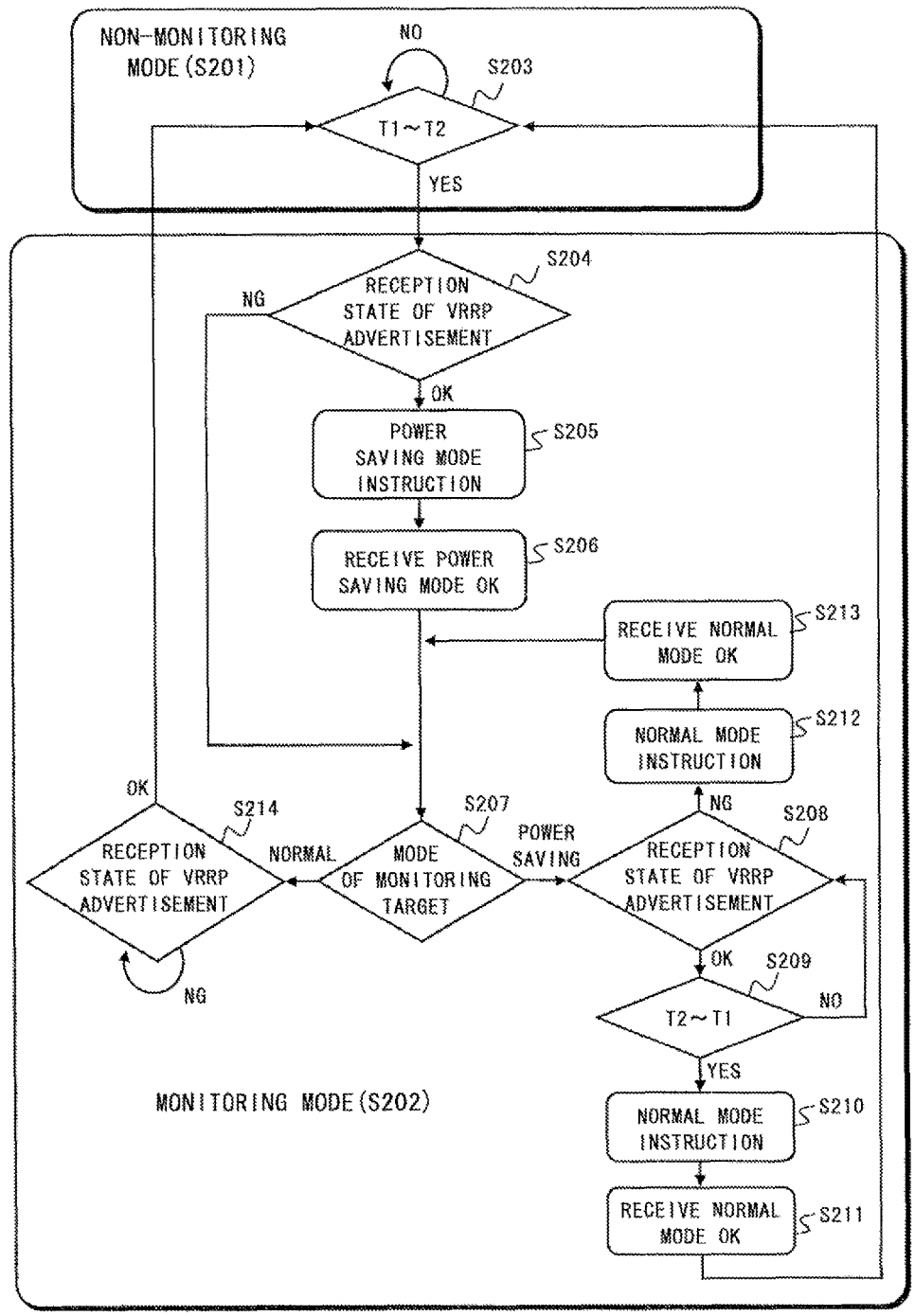
FIG. 8 is a state transition diagram regarding the switch 13 shown in FIG. 1.

FIG. 8 is a diagram showing a specific example of the state transition of the switch 13. The switch 13 performs state transition between the non-monitoring mode (S201) in which proxy monitoring of the VRRP advertisement is not performed and the monitoring mode (S202) in which proxy monitoring is performed. In the example of FIG. 8, time T1 to time T2 is set as the time period in which the proxy monitoring is performed. The switch 13 that operates in the non-monitoring mode judges whether or not the operation is in the time period (T1 to T2) (S203). At the time period at which the proxy monitoring is performed, the switch 13 makes a transition to the monitoring mode (S202).

The switch 13 that operates in the monitoring mode monitors the reception state of the VRRP advertisement transmitted from the master router 11 (step S204). When the VRRP advertisement can continuously and normally be received, the switch 13 transmits the transition instruction to the power saving mode to the router 12 (step S205). In step S206, the switch 13 receives transition completion notification to the power saving mode from the router 12.

In step S207, the switch 13 judges the operation mode of the router 12 which is the monitoring target. When the router 12 is in the power saving mode, the switch 13 judges the reception state of the VRRP advertisement transmitted from the master router 11 (step S208). When the VRRP advertisement can continuously be received, the switch 13 continues to monitor the VRRP advertisement in the time period of proxy monitoring (step S209). Then, at the time to end the proxy monitoring, the switch 13 transmits the transition instruction to the normal mode to the router 12 (steps S209, S210). Thereafter, in accordance with the reception of the transition completion notification to the normal mode from the router 12, the switch 13 makes a transition to the non-monitoring mode (S211).

On the other hand, upon detection of the reception abnormality of the VRRP advertisement in step S208, the switch 13 transmits the transition instruction to the normal mode to the router 12 without waiting for the completion of the time period of the proxy monitoring (S212). Even after the transition completion notification to the normal mode is received from the router 12 (S213), the switch 13 continues to monitor the VRRP advertisement from the router 11 in which failure or the like may possibly occur (S214). When the VRRP advertisement can be received from the router 11 due to the recovery from the failure, the switch 13 makes a transition to the non-monitoring mode (step S214).

Figure 9:
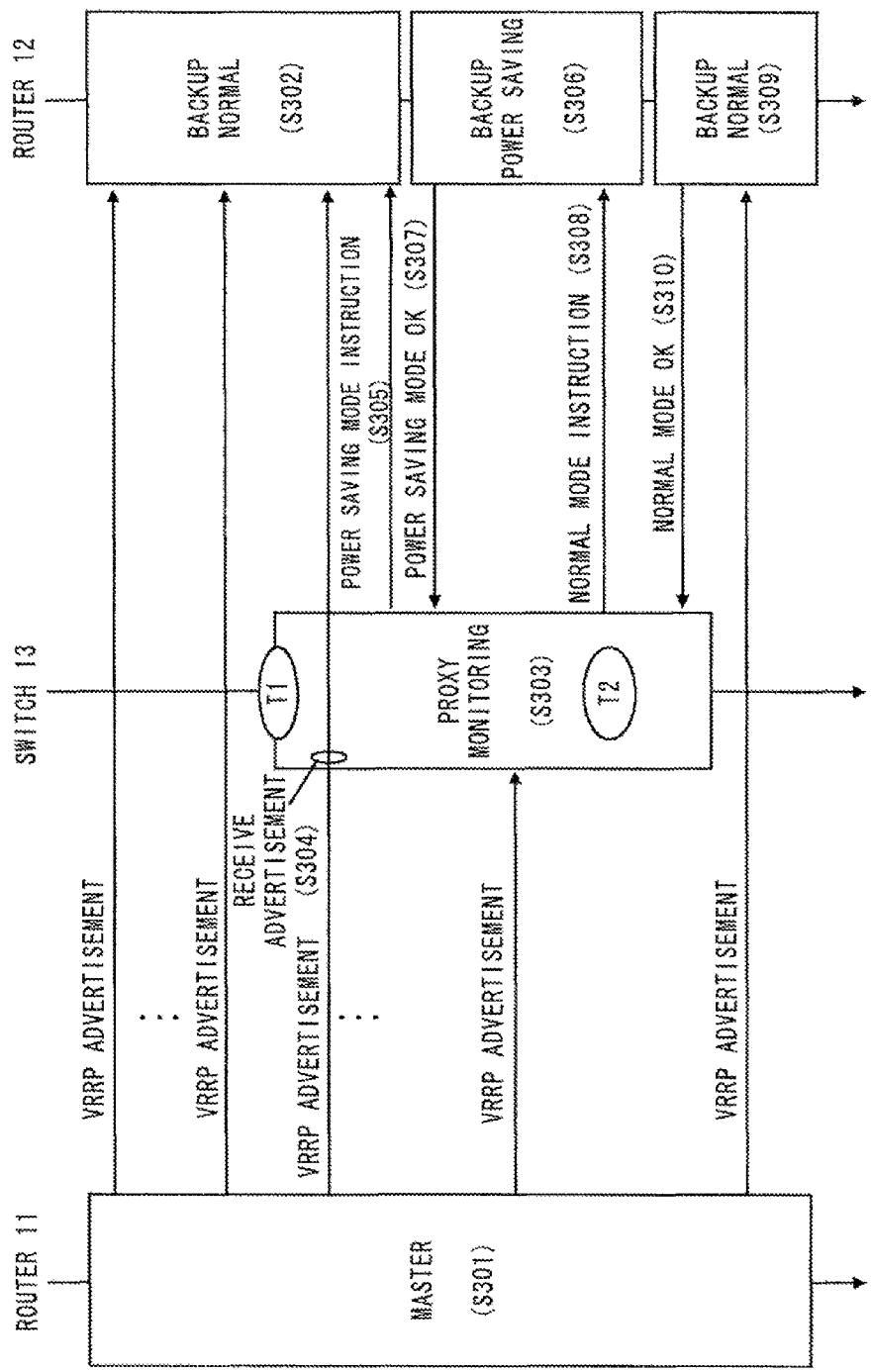
FIG. 9 is a sequence diagram showing mode switching procedure of the packet forwarding system according to the first exemplary embodiment of the present invention.

Subsequently, the cooperation of the routers 11 and 12 and the switch 13 regarding the operation mode switching of the router 12 will be described using a sequence diagram. FIG. 9 is a sequence diagram in a case where the router 12 makes a transition to the power saving mode at a predetermined time period (T1 to T2). At first, the router 11 performs the master router operation (S301), and the router 12 performs the backup router operation in the normal mode (S302). At time T1 at which the router 12 should make a transition to the power saving mode, the switch 13 turns to the monitoring mode (S303). The switch 13 checks normal reception of the VRRP advertisement from the router 11 which is the master router (S304), and transmits the transition instruction to the power saving mode to the router 12 (S305). Note that the reason of transmitting the transition instruction to the normal mode after checking the normal reception of the VRRP advertisement is to prevent the router 12 from being made to the power saving mode even when the router 11 is in the failure state. To implement the similar protection, the router 12 may make a transition from the normal mode to the power saving mode after checking the normal reception of the VRRP advertisement from the master router. The router 12 notifies the switch 13 of the completion of the mode change (S307) after making a transition to the power saving mode (S306).

The switch 13 that performs the proxy monitoring of the VRRP advertisement transmits the transition instruction to the normal mode to the router 12 at time T2 at which the power saving mode should be terminated (S308). The router 12 makes a transition to the normal mode according to the instruction (S309), and notifies the switch 13 of the mode change completion (S310). The router 12 that recovers to the normal mode restarts the autonomous monitoring of the VRRP advertisement transmitted from the master router (router 11).

Figure 10:
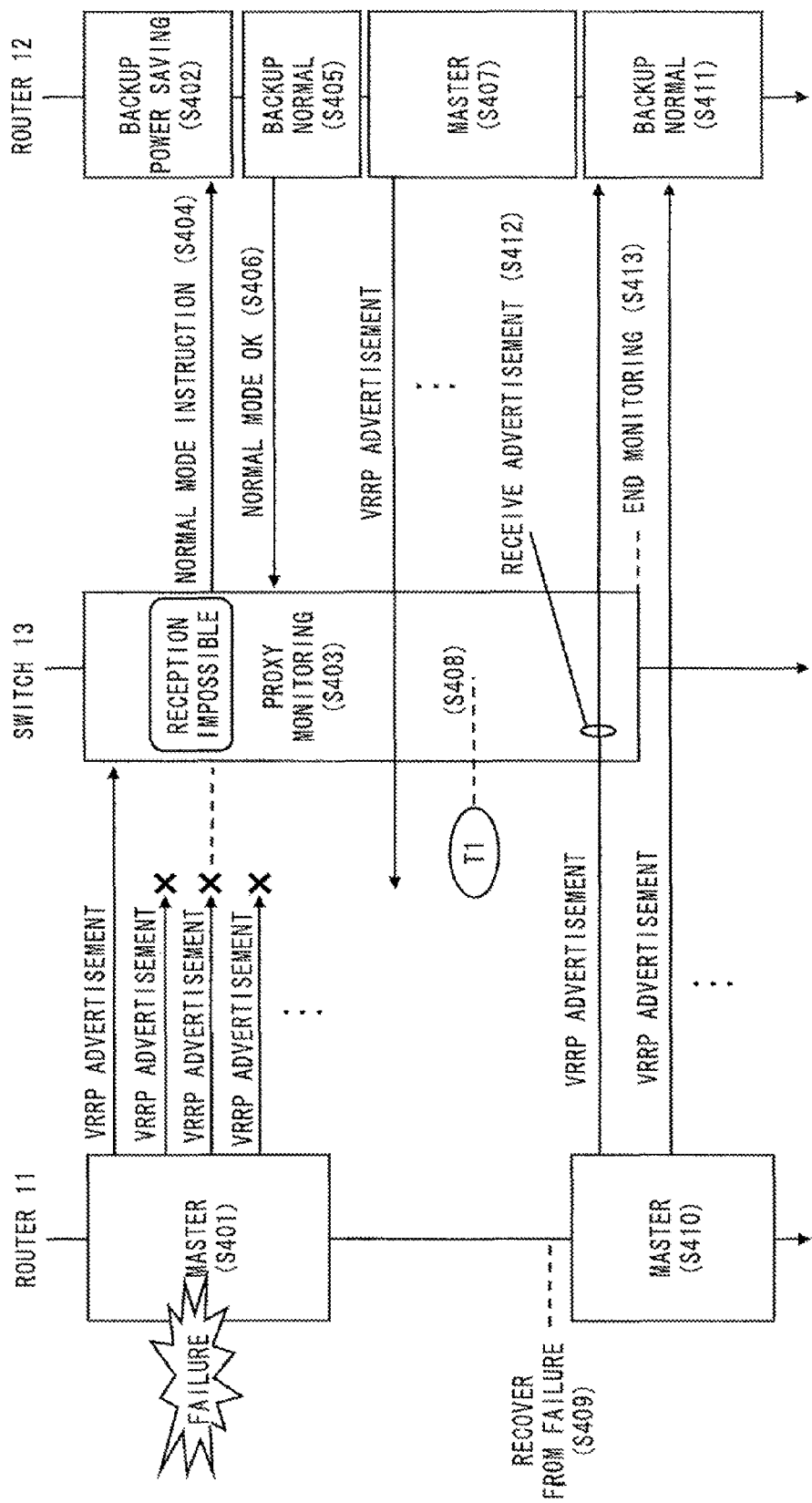
FIG. 10 is a sequence diagram showing mode switching procedure of the packet forwarding system according to the first exemplary embodiment of the present invention.

Next, the operation in a case in which the failure occurs in the master router (router 11) while the router 12 performs the power saving mode operation will be described with reference to a sequence diagram of FIG. 10. Upon occurrence of any failure in the router 11 in the master router operation (S401), the switch 13 in the monitoring mode operation (S403) cannot receive the VRRP advertisement. The switch 13 detects the reception abnormality of the VRRP advertisement, and transmits the transition instruction to the normal mode to the router 12 (S404). The router 12 that receives the transition instruction makes a transition from the power saving mode (S402) to the backup router operation in the normal mode (S405), and notifies the switch 13 of the completion of mode change (S406). After that, the router 12 operates in accordance with VRRP, makes a transition to the master router operation, and starts transmission of the VRRP advertisement (S407).

The switch 13 continues to monitor the VRRP advertisement from the router 11 even after receiving the notification from the router 12. When T1 comes again despite no recovery if the failure in the router 11 (S408), the switch 13 does not transmit the transition instruction to the power saving mode. The purpose of this is to prevent the occurrence of communication failure in both of the routers 11 and 12. When the router 11 recovers from the failure (S409), the router 11 functions as the master router again (S410), and the VRRP advertisement transmitted by the router 11 can be received (S412), the switch 13 terminates the monitoring mode and makes a transition to the non-monitoring mode (S413).

As stated above, the router 12 according to the first exemplary embodiment is able to make a transition to the power saving mode in which the monitoring of the VRRP advertisement transmitted from the master router 11 is not performed. Further, the switch 13 monitors the VRRP advertisement on behalf of the router 12 which is in the power saving mode, and makes the router 12 transit to the normal mode upon detection of the failure in the master router 11. Accordingly, it is possible to reduce power consumption of the router 12 in the backup operation and to deal with the failure of the master router 11 that occurs when the router 12 operates in the power saving mode in the redundancy configuration by VRRP. In summary, according to the first exemplary embodiment, high availability and low power consumption can be achieved at the same time in the redundancy configuration by VRRP.

Figure 11:
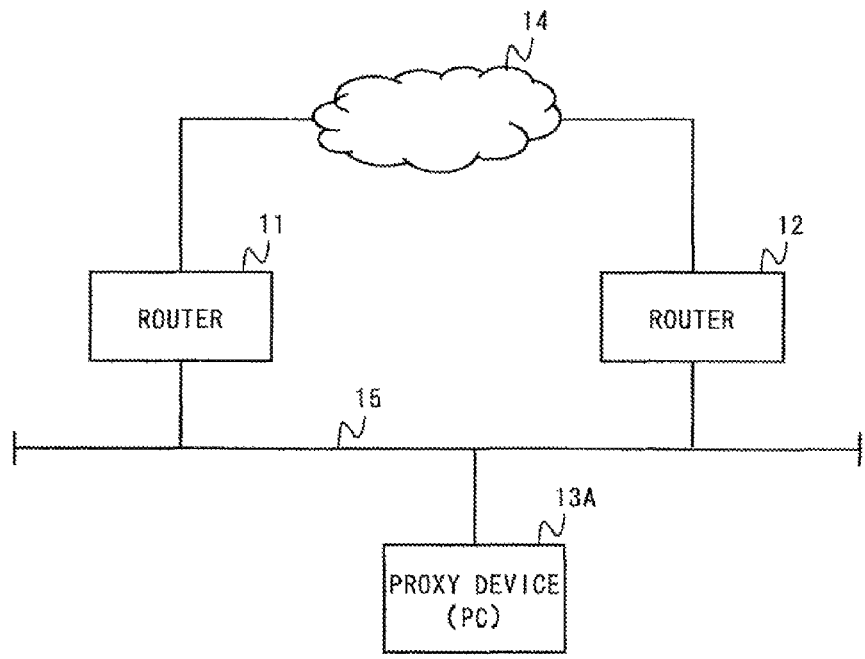
FIG. 11 is a diagram showing a variant example of the packet forwarding system according to the first exemplary embodiment of the present invention.

In the first exemplary embodiment, it is the switch 13 that performs the proxy monitoring of the VRRP advertisement. However, the proxy monitoring of the VRRP advertisement may be performed by another device that is connected to the network 15. For example, as shown in FIG. 11, a proxy device 13A that performs proxy monitoring of the VRRP advertisement may be a host such as a PC (Personal Computer) or the like. For example, a terminal for performing OAM (Operation Administration and Maintenance) of the routers 11 and 12 may be provided with the function as the proxy device.

Figure 12:
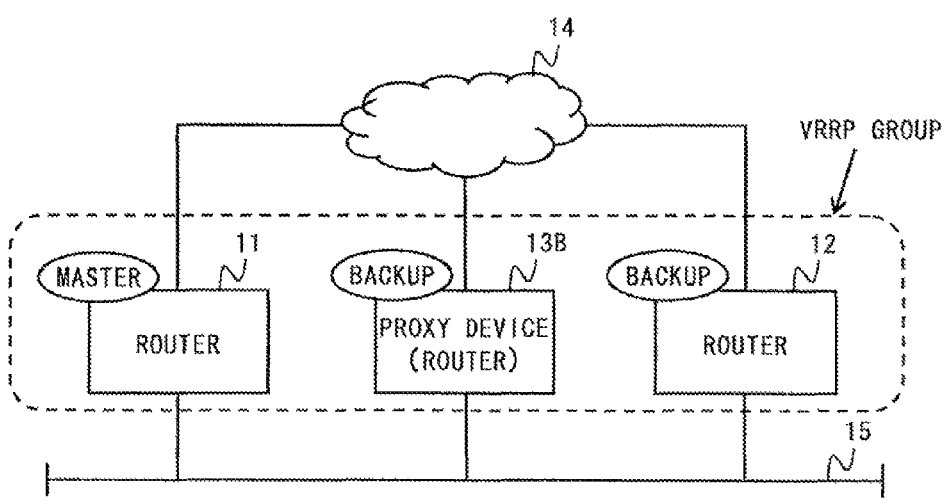
FIG. 12 is a diagram showing a variant example of the packet forwarding system according to the first exemplary embodiment of the present invention.

Further, as shown in FIG. 12, a proxy device 13B that performs the proxy monitoring of the VRRP advertisement may be another router that belongs to the same VRRP group as the routers 11 and 12. The router that belongs to the same VRRP group originally monitors the VRRP advertisement transmitted by another router. Accordingly, additional load of the device (router) 13B to perform the proxy monitoring on behalf of the router 12 in which the mode is changed to the power saving mode is quite small, and the device (router) 13B is suitable for performing the proxy monitoring. Further, the proxy device that performs the proxy monitoring of the VRRP advertisement may be a router that does not belong to the same VRRP group as the routers 11 and 12.

The operation mode control performed by the forward controlling unit 123 shown in FIG. 5 may be implemented with a semiconductor processing device such as ASIC, DSP or the like. Further, this processing may be implemented by causing a computer such as a microprocessor or the like to executes the control program including instructions according to the state transition control (FIG. 7, for example). This control program may be stored in various types of storage media, and may be transmitted through communication medium. Now, the storage media include, for example, flexible disk, hard disk, magnetic disk, magneto-optical disk, CD-ROM, DVD, ROM cartridge, RAM memory cartridge with battery backup, flash memory cartridge, non-volatile RAM cartridge or the like. Further, the communication medium includes wired communication medium such as telephone line and wireless communication medium such as microwave line, including the Internet.

Further, control of changing operation mode including proxy monitoring of the VRRP advertisement executed by the proxy monitoring unit 133 included in the switch 13 may be implemented with a semiconductor processing device such as ASIC, DSP, microprocessor or the like. This processing may be realized by causing a computer such as a microprocessor or the like to executes the control program including instructions according to the control procedure (FIG. 8, for example).

Second Exemplary Embodiment

In the first exemplary embodiment, one VRRP group is formed of two routers 11 and 12, as an example. However, the routers 11 and 12 may form a plurality of VRRP groups whose priority levels are different in order to effectively perform load distribution. Further, the routers 11 and 12 may form a VRRP group formed of three or more routers in total including additional routers. In the second exemplary embodiment, a variant example will be described in which three VRRP groups are formed by three routers.

Figure 13:
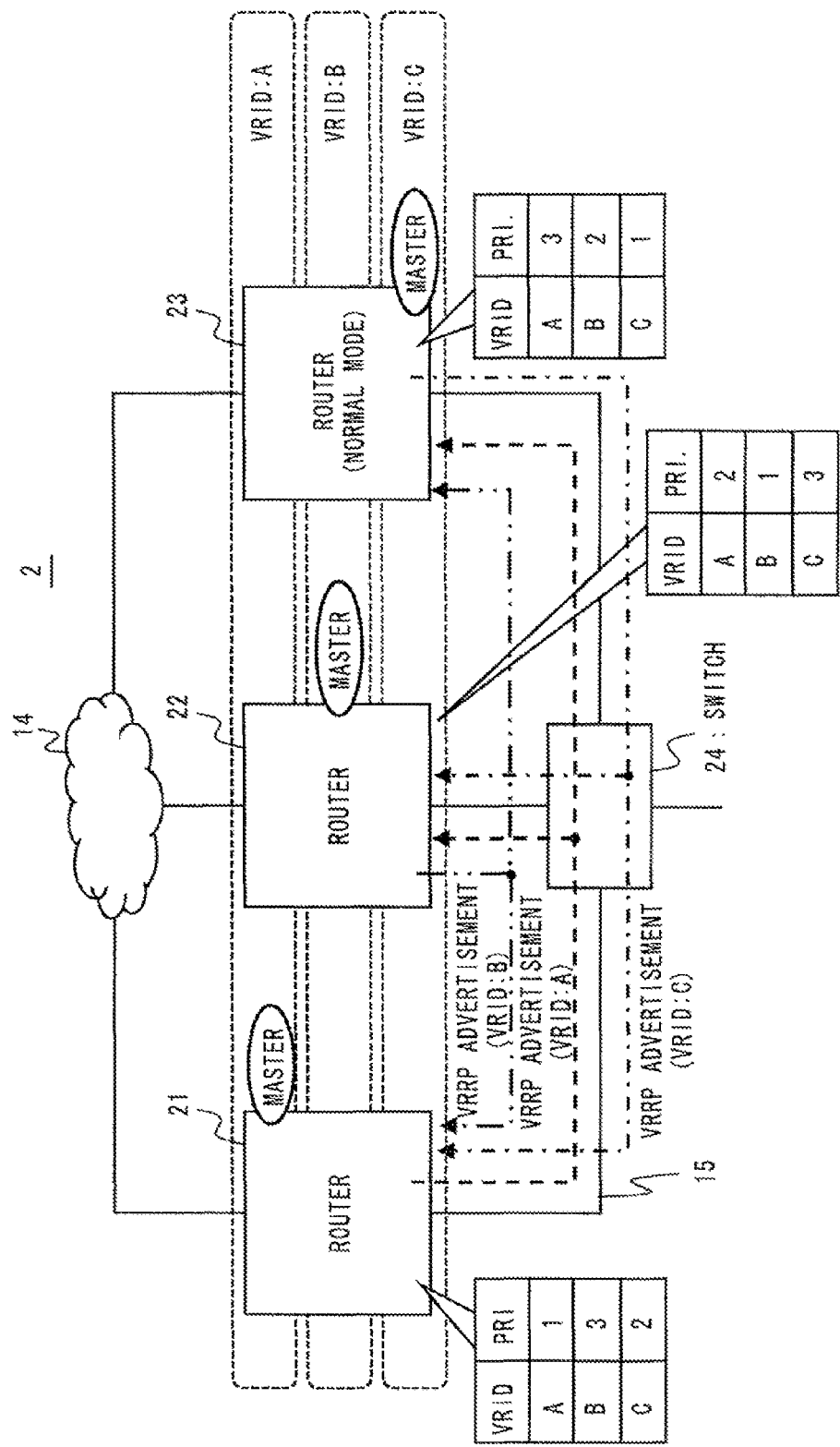
FIG. 13 is a configuration diagram of a packet forwarding system according to a second exemplary embodiment of the present invention.

FIG. 13 is a diagram showing a configuration example of a packet forwarding system 2 according to the second exemplary embodiment. The packet forwarding system 2 includes routers 21 to 23, and a switch 24. The routers 21 to 23 form three VRRP groups whose VRIDs are "A", "B", and "C". The example of setting priorities for the routers 21 to 23 regarding three VRRP groups is shown in FIG. 13. More specifically, the router 21 preferentially functions as a master router in VRID "A". The router 22 preferentially functions as a master router in VRID "B". The router 23 preferentially functions as a master router in VRID "C". Further, the priority levels among the routers in VRID "A" to "C" are as follows.

VRID "A": router 21>router 22>router 23
VRID "B": router 22>router 23>router 21
VRID "C": router 23>router 21>router 22

Setting a plurality of VRRP groups in the same set of routers as above is typically performed for realizing load distribution between routers.

In FIG. 13, the router 23 switches the mode between the normal mode and the power saving mode as is similar to the router 12 that is described above. Further, the switch 24 performs the proxy monitoring of the VRRP advertisement transmitted by the master router as is similar to the switch 13 that is described above.

Figure 14:
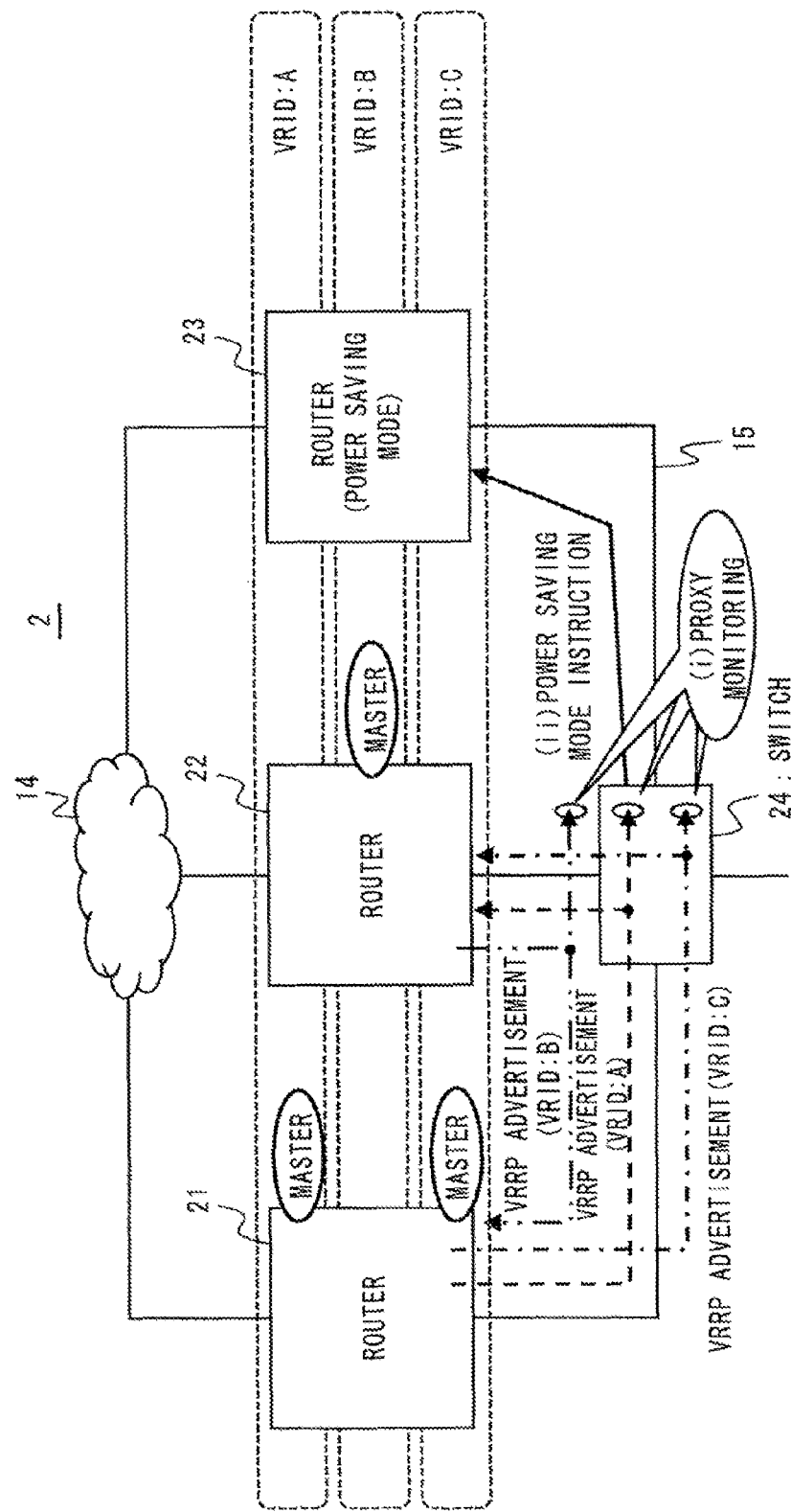
FIG. 14 is a diagram showing switch to the power saving mode of the packet forwarding system according to the second exemplary embodiment of the present invention.

FIG. 14 is a diagram showing a case in which the mode of the router 23 is changed from the normal mode to the power saving mode. In short, FIG. 14 corresponds to FIG. 2 that is described in the first exemplary embodiment. The switch 24 starts the proxy monitoring of the VRRP advertisement transmitted from the routers 21 and 22 regarding three VRRP groups, and instructs the router 23 to make a transition to the power saving mode. Upon receiving the instruction from the switch 24, the router 23 makes a transition to the power saving mode in which the VRRP advertisement is not monitored, which is the cold standby state. Accordingly, in the VRRP group of VRID "C", the router 21 whose priority is second-highest after the router 23 starts the operation as the master router.

Figure 15:
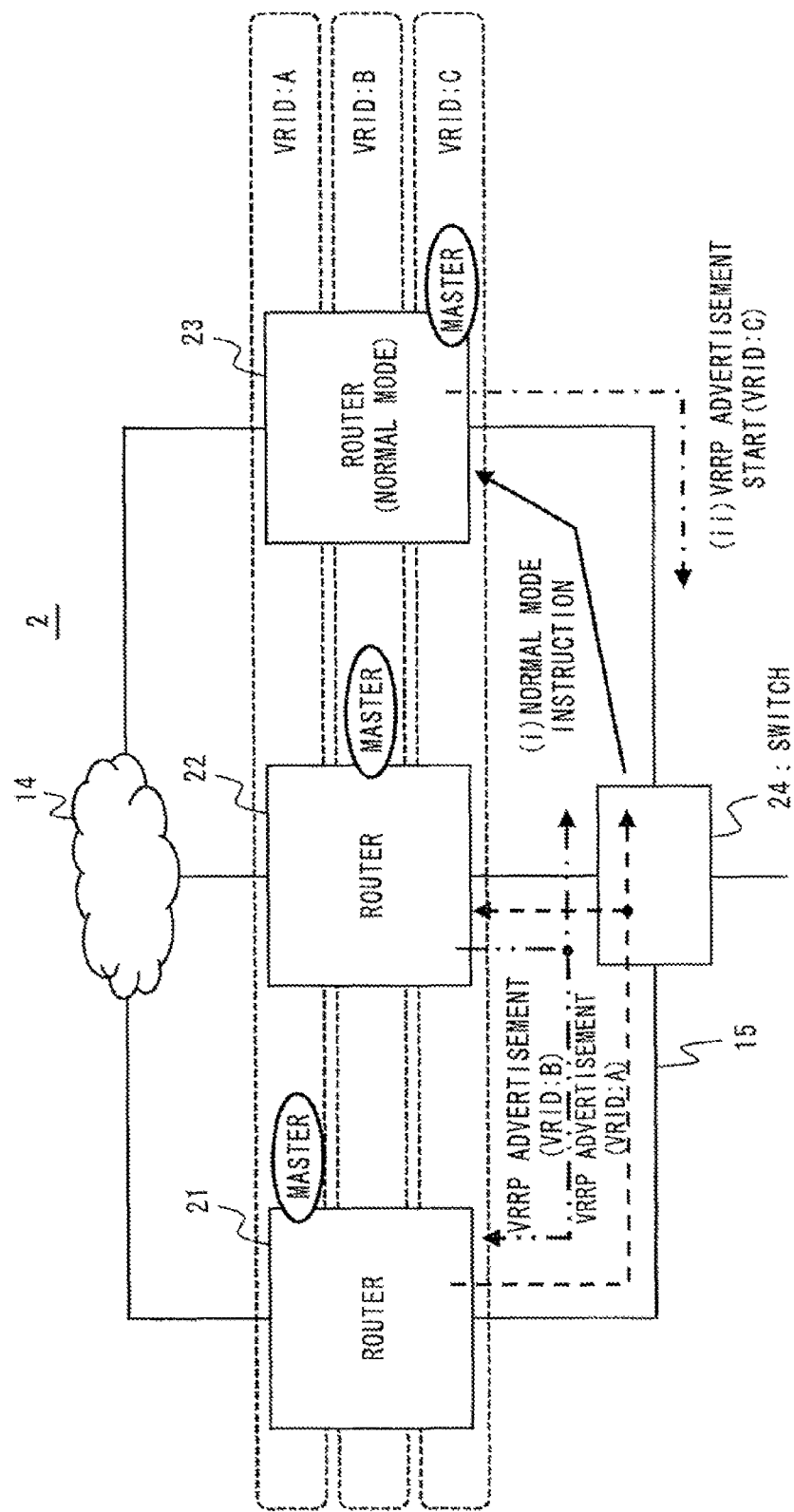
FIG. 15 is a diagram showing switch to the normal mode of the packet forwarding system according to the second exemplary embodiment of the present invention.

FIG. 15 is a diagram showing a case in which the mode is changed from the power saving mode to the normal mode. In short, FIG. 15 corresponds to FIG. 3 that is described in the first exemplary embodiment. The switch 24 instructs the router 23 to make a transition to the normal mode upon judgment of the establishment of the predetermined condition. The condition of changing the mode of the router 23 from the power saving mode to the normal mode is not particularly limited but can be determined in accordance with the condition of switching the mode from the normal mode to the power saving mode described above. For example, the switch 24 may instruct the router 23 to make a transition to the normal mode upon termination of the time period in which the mode should be the power saving mode. Alternatively, the switch 24 may monitor the traffic amount, and may instruct the router 23 to switch the mode to the normal mode when the traffic statistics exceeds the predetermined threshold value.

In FIG. 15, the router 23 that receives the instruction from the switch 24 recovers to the normal mode. After recovery to the normal mode, the router 23 communicates the VRRP advertisement with other routers 21 and 22, and eventually operates as the master router in the VRRP group of VRID "C", so as to start the VRRP advertisement of VRID "C".

Figure 16:
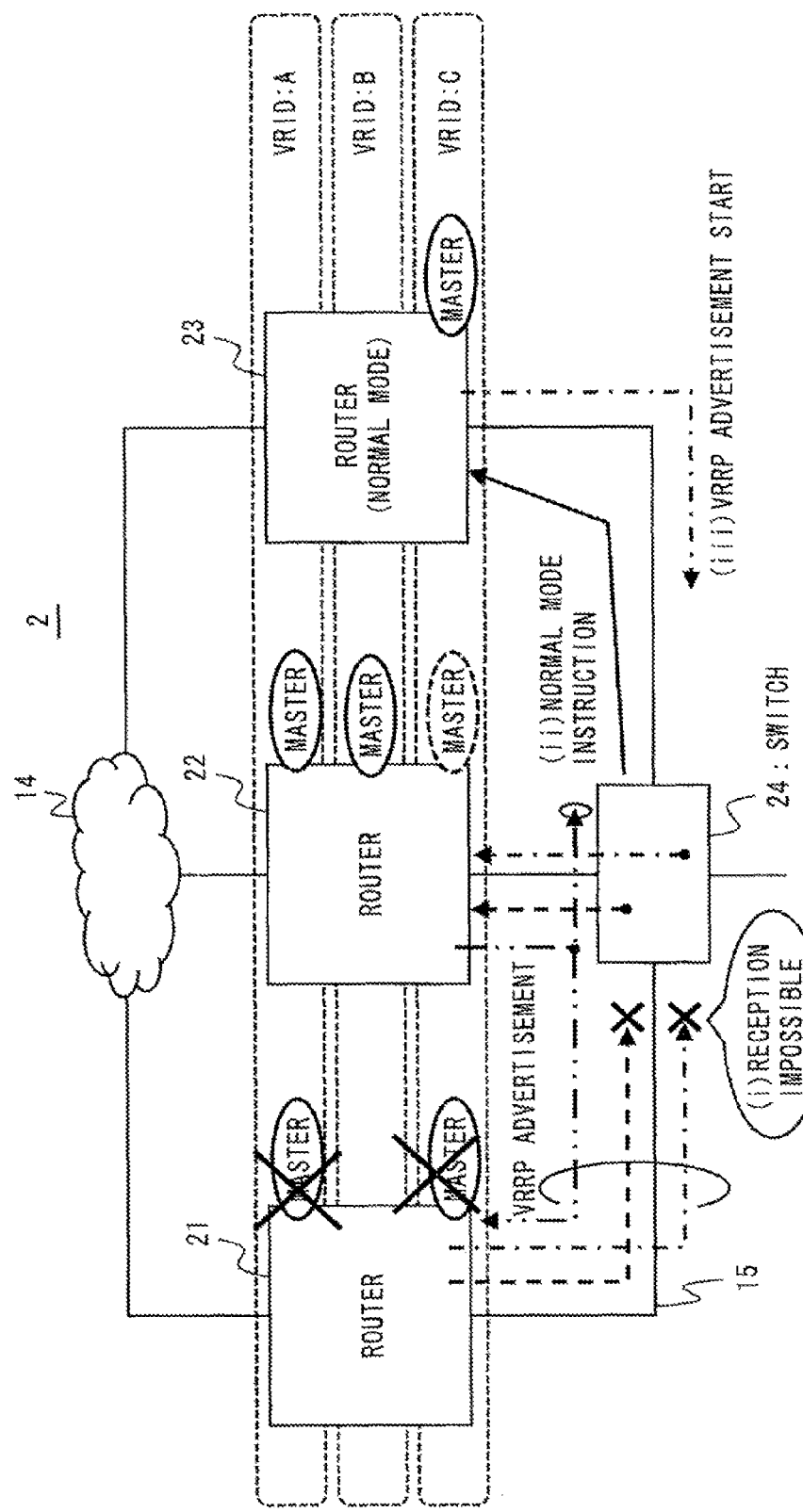
FIG. 16 is a diagram showing switch to the normal mode of the packet forwarding system according to the second exemplary embodiment of the present invention.

FIG. 16 is a diagram showing a case in which the router 23 recovers to the normal mode when the failure occurs in the router 21 or 22 while the router 23 operates in the power saving mode. In short, FIG. 16 corresponds to FIG. 4 described in the first exemplary embodiment. In this example, it is assumed that the failure occurs in the router 21. Upon occurrence of the failure in the router 21, the reception of the VRRP advertisement of VRID "A" and "C" is interrupted. The switch 24 that monitors the VRRP advertisement transmits the transition instruction to the normal mode to the router 23 when at least one reception of the VRRP advertisement of VRID "A" and "C" is made impossible.

In FIG. 16, the router 23 that receives the instruction from the switch 24 recovers to the normal mode. Focusing on the operation regarding each VRRP group, the router 22 whose priority level is higher than the router 23 functions as the master router for VRID "A" and "B". Further, regarding VRID "C", upon occurrence of the failure in the router 21, the router 22 temporarily functions as the master router in a state in which the router 23 is in the power saving mode, and thereafter the router 23 whose priority level is the highest eventually functions as the master router.

Note that, as described in the first exemplary embodiment of the present invention, the device that performs the proxy monitoring of the VRRP advertisement is not limited to the switch. Further, the timing at which the mode is switched between the normal mode and the power saving mode based on the time may be judged by the router 23 itself.

Third Exemplary Embodiment

As described in the first and second exemplary embodiments, various conditions such as time, traffic amount, or combination thereof may be set as the condition of switching the power saving mode and the normal mode. In the third exemplary embodiment, a specific example will be described in which the power saving mode and the normal mode are switched according to increase or decrease of the traffic amount that should be processed by the routers that form the VRRP group.

Figure 17:
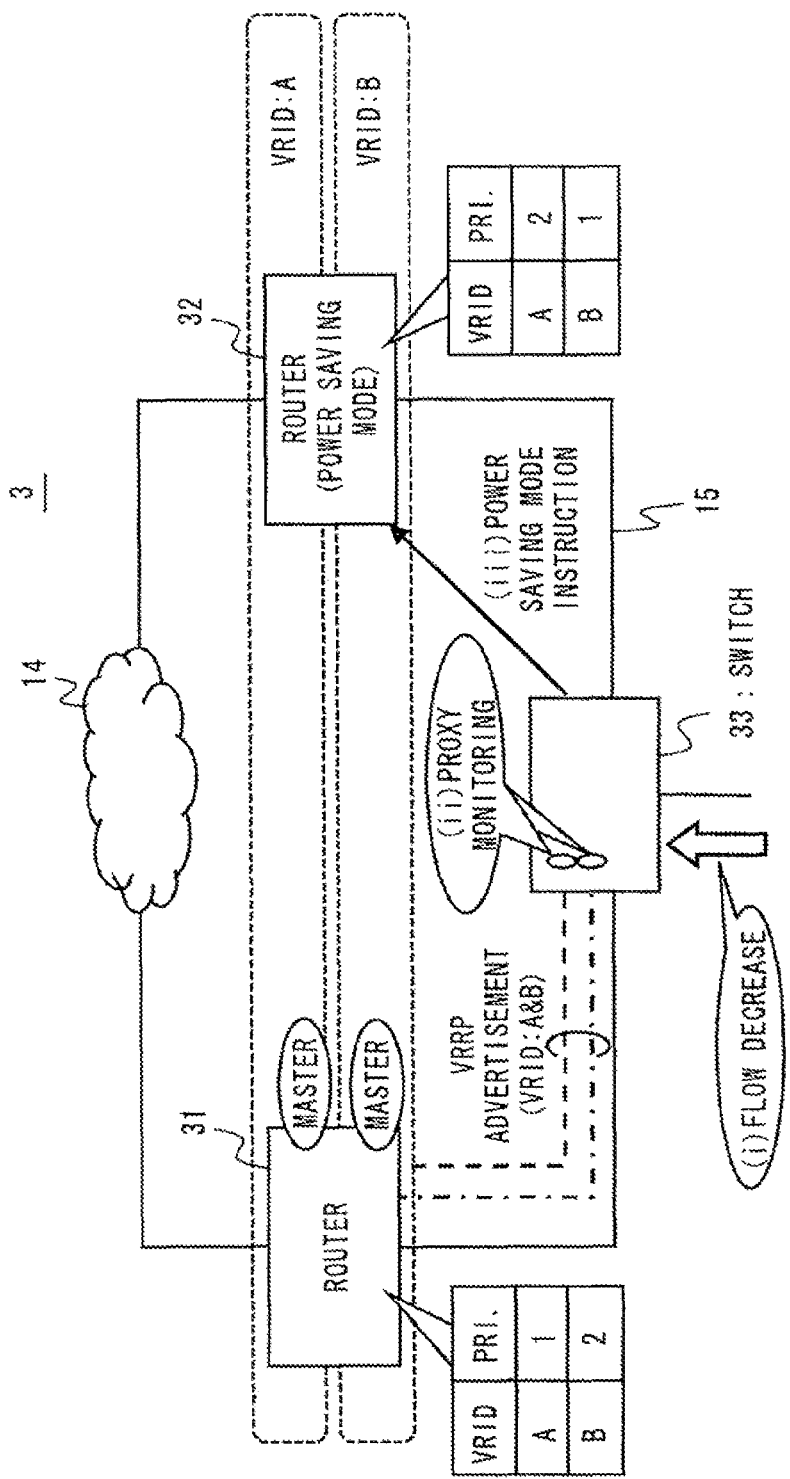
FIG. 17 is a diagram showing switch to the power saving mode of a packet forwarding system according to a third exemplary embodiment of the present invention.

FIG. 17 is a diagram showing a configuration example of a packet forwarding system 3 according to the third exemplary embodiment. The packet forwarding system 3 includes routers 31 and 32, and a switch 33. The routers 31 and 32 form two VRRP groups whose VRIDs are "A" and "B". In FIG. 17, the router 32 switches the mode between the normal mode and the power saving mode as is similar to the router 12 described above. Further, the switch 33 performs the proxy monitoring of the VRRP advertisement transmitted by the master router as is similar to the switch 13 described above.

An example of setting the priority for the routers 31 and 32 regarding two VRRP groups is shown in FIG. 17. In summary, the router 31 preferentially functions as a master router in VRID "A". On the other hand, the router 32 preferentially functions as a master router in VRID "B". Thus, the router 31 and the router 32 which is in the normal mode operation can perform load distribution. In summary, the IP packet that is transmitted or received by the host where the virtual router address of VRID "A" is designated is forwarded by the router 31. On the other hand, the IP packet that is transmitted or received by the host where the virtual router address of VRID "B" is designated is forwarded by the router 32.

Note that FIG. 17 shows a case in which the mode is changed from the normal mode to the power saving mode. The switch 33 monitors the traffic amount processed by the switch 33 itself. Then, the switch 33 starts the proxy monitoring of the VRRP advertisement and instructs the router 32 to make a transition to the power saving mode when the traffic statistics is below the certain reference value. When the router 32 is in the power saving mode, the router 31 turns into the master router for VRID "B" as well. Accordingly, when the traffic volume is small, only one router 31 performs the packet forwarding processing and the other router 32 is in the power saving mode, thereby reducing power consumption.

Figure 18:
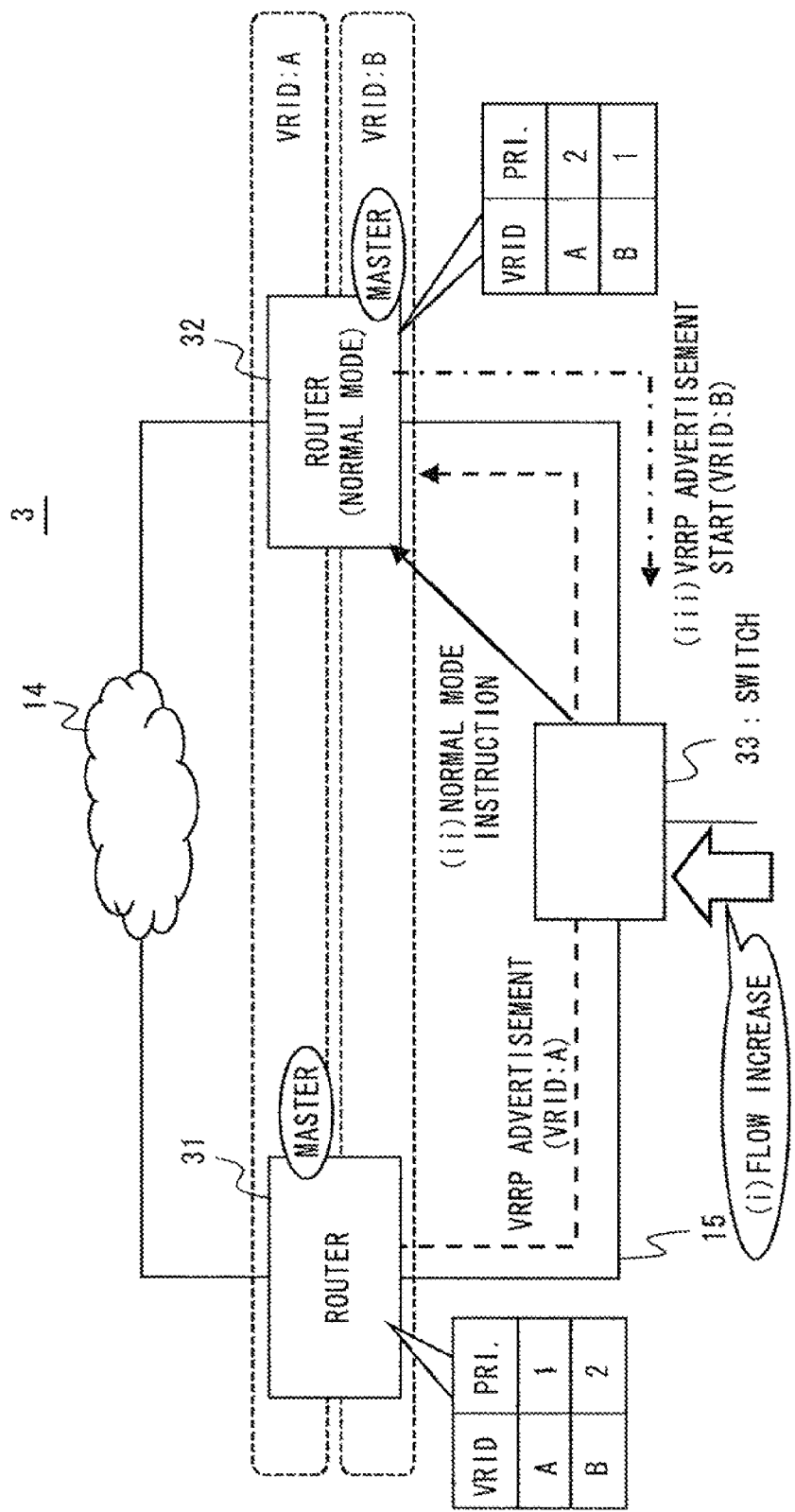
FIG. 18 is a diagram showing switch to the normal mode of the packet forwarding system according to the third exemplary embodiment of the present invention.

FIG. 18 shows a state in which the mode is changed from the power saving mode to the normal mode. The switch 33 instructs the router 32 to make a transition to the normal mode when the traffic statistics exceeds the certain reference value. When the router 32 returns to the normal mode, the router 32 performs as the master router on behalf of the router 31 for VRID "B". Accordingly, load distribution is started between the router 31 and the router 32.

Figure 19:
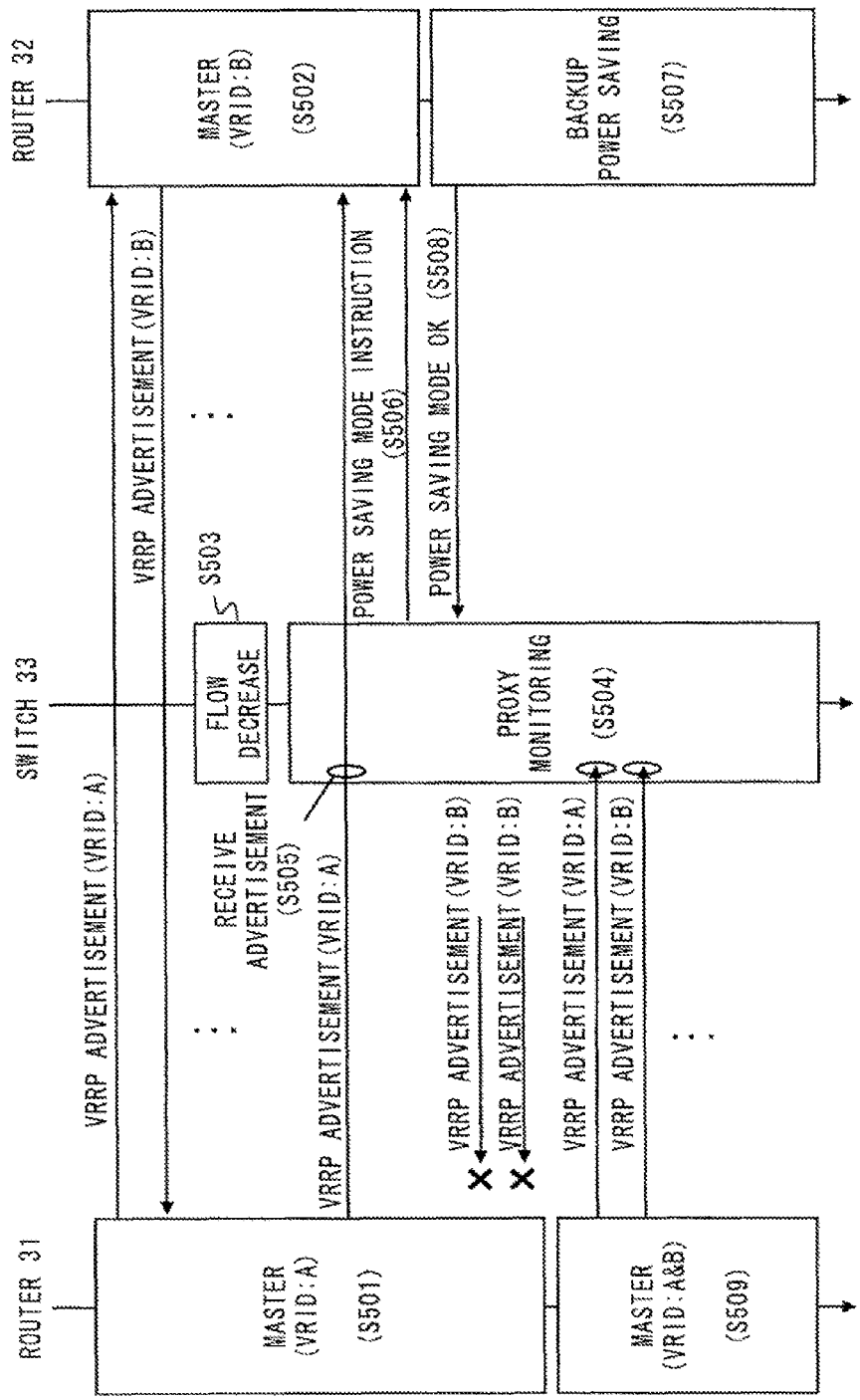
FIG. 19 is a sequence diagram showing mode switching procedure of the packet forwarding system according to the third exemplary embodiment of the present invention.

In the following description, cooperation of the switch 33 and the routers 31 and 32 regarding the operation mode switching of the router 32 will be described with a sequence diagram. FIG. 19 is a sequence diagram of a case in which the router 32 makes a transition to the power saving mode in accordance with the decrease of the traffic amount. At the first part of the sequence diagram, the router 31 functions as the master router regarding VRID "A" (S501), and the router 32 functions as the master router regarding VRID "B" (S502). Each of the routers 31 and 32 monitors the VRRP advertisement transmitted from each other.

In step S503, the switch 33 detects the decrease of the data traffic (data flow) amount. Upon detecting the decrease of the traffic amount, the switch 33 starts monitoring the VRRP advertisement (S504). Then, the switch 33 confirms that the VRRP advertisement transmitted from the router 31 is normally received (S505), and instructs the router 32 to make a transition to the power saving mode (S506).

Upon receiving the instruction from the switch 33, the router 32 makes a transition to the power saving mode (S507), and notifies the switch 33 of completion of mode switching (S508). As the router 32 makes a transition to the power saving mode, the router 31 cannot receive the VRRP advertisement regarding VRID "B" from the router 32. Accordingly, the router 31 starts the master router operation also for VRID "B" (S509).

Figure 20:
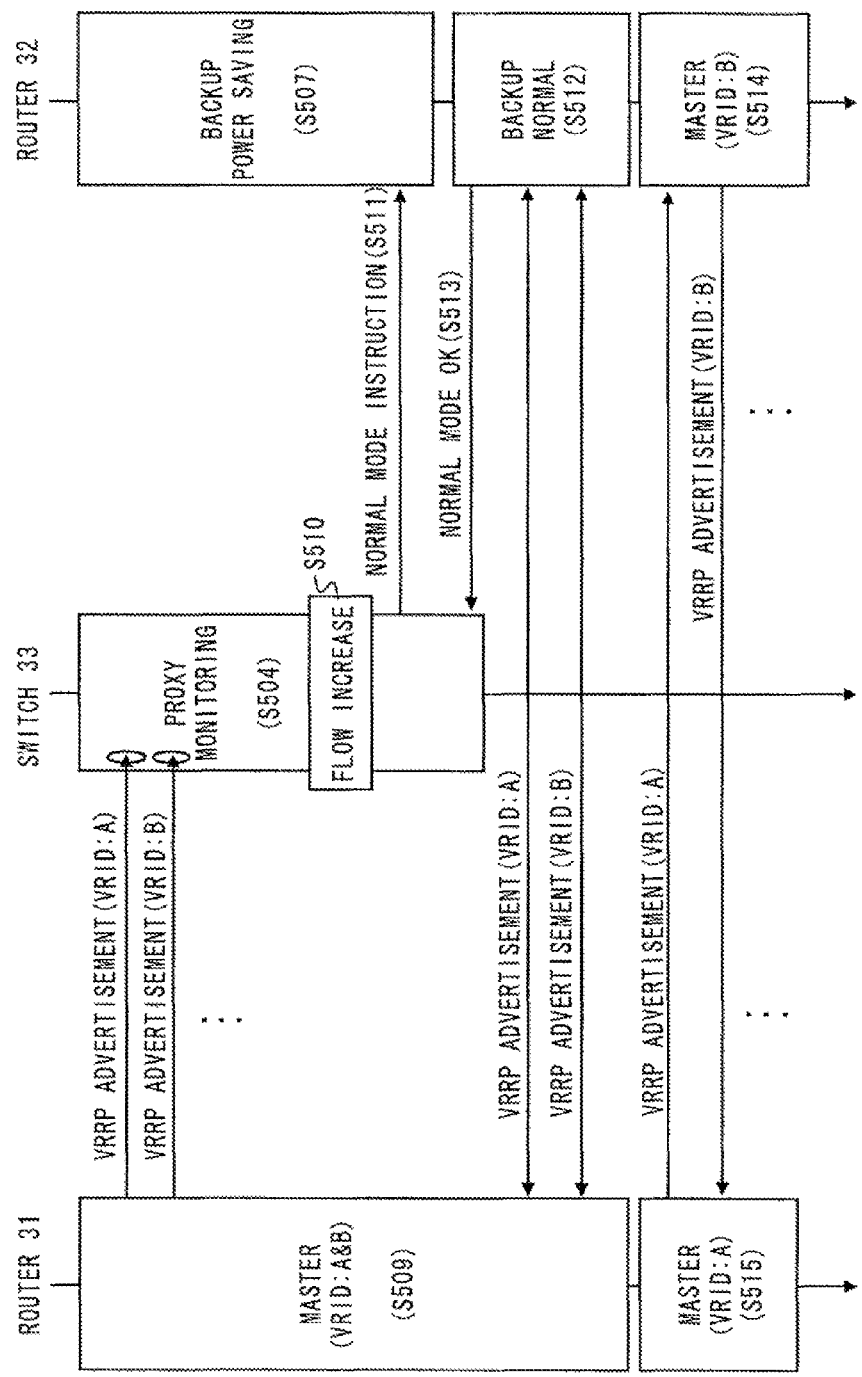
FIG. 20 is a sequence diagram showing mode switching procedure of the packet forwarding system according to the third exemplary embodiment of the present invention.

Next, referring to a sequence diagram of FIG. 20, the operation will be described of a case in which the traffic that should be processed by the router 31 increases while the router 32 performs the power saving mode operation. Upon detection of increase of the data traffic (data flow) amount (S510) while executing the proxy monitoring (S504), the switch 33 instructs the router 32 to make a transition to the normal mode (S511). Upon receiving the instruction from the switch 33, the router 32 makes a transition to the normal mode (S512), and notifies the switch 33 of completion of mode switching (S513). Receiving the notification in S513, the switch 33 terminates the proxy monitoring of the VRRP advertisement.

The router 32 that recovers to the normal mode communicates the VRRP advertisement with the router 31, and starts the master router operation regarding VRID "B" in accordance with the setting of the priority level (S514). Accordingly, the router 31 keeps performing the master router operation regarding VRID "A", and makes a transition to the backup router operation regarding VRID "B". Accordingly, the load distribution between the routers 31 and 32 can be achieved when the traffic amount is increased.

As described in the third exemplary embodiment, it is effective to switch the normal mode and the power saving mode based on the increase or decrease of the traffic amount along with the configuration that achieves load distribution between routers by setting a plurality of VRRP groups. When the traffic amount is small, the mode of the router is changed to the power saving mode so as to reduce power consumption, whereby load distribution between routers with VRRP can effectively be performed.

Note that the device that performs proxy monitoring of the VRRP advertisement is not limited to the switch, as described in the first and second exemplary embodiments. Further, the switch between the normal mode and the power saving mode based on the traffic amount may be judged by the router 32 itself.

Although the system including two routers 31 and 32 has been described in the third exemplary embodiment for the sake of clarity of illustration, the present invention may also be applied to a system including three or more routers, as a matter of course.

In the first to third exemplary embodiments of the present invention, the switches 13, 24, and 33 that perform proxy monitoring of the VRRP advertisement basically stop monitoring the VRRP packets when the routers 12, 23, and 33 are in the normal mode. However, the switches 13, 24, and 33 or the proxy device on behalf of them may continuously perform monitoring of the VRRP advertisement even when the routers 12, 23 and 33 are in the normal mode.

Furthermore, in the first to third exemplary embodiments of the present invention, the system including the router device that supports the VRRP and performs the forward processing of the IP packet has been described. However, the present invention is broadly applicable to a system that makes the packet forwarding device redundant by performing transmission and reception of control packets like VRRP packets.

An exemplary advantage according to the above-described exemplary embodiments is to reduce power consumption of a packet forwarding device that supports redundancy protocol and performs standby system operation (backup operation).

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A packet forwarding system comprising:
    a first packet forwarding device that forms a redundancy group with another packet forwarding device, the first packet forwarding device being configured to switch a master operation and a backup operation with the another packet forwarding device in a complementary manner; and
    a proxy device, wherein
    the first packet forwarding device is configured to switch a first operation mode and a second operation mode in the backup operation, the first operation mode is a normal mode, the normal mode monitoring a control packet transmitted regarding the redundancy group from the another packet forwarding device that performs the master operation, and the second operation mode is a power saving mode, the power saving mode not monitoring the control packet transmitted from the another packet forwarding device,
    the proxy device is configured to monitor the control packet transmitted from the another packet forwarding device on behalf of the first packet forwarding device when the first packet forwarding device is in the second operation mode, and to control switching between the first and second operation modes of the first packet forwarding device based on monitor result of the control packet, and to stop monitoring the control packet transmitted from the another packet forwarding device when the first packet forwarding device is in the first operation mode, and
    the redundancy group excludes the proxy device in the first and second operation modes.

2. The packet forwarding system according to claim 1, wherein the proxy device is arranged in a communication device that does not belong to the redundancy group but perform data forwarding processing in a lower layer than the first packet forwarding device and the another packet forwarding device.

3. The packet forwarding system according to claim 1, wherein the first packet forwarding device makes a transition from the first operation mode to the second operation mode under a condition that a predetermined time has come.

4. The packet forwarding system according to claim 3, wherein the proxy device judges whether the predetermined time has come, and instructs the first packet forwarding device to switch the operation mode according to the judgment.

5. The packet forwarding system according to claim 1, wherein switching of the first and second operation modes is determined on a basis of amount of data that should be forwarded by the redundancy group.

6. The packet forwarding system according to claim 5, wherein the proxy device makes a judgment regarding the amount of data, and instructs the first packet forwarding device to switch the operation mode according to the judgment.

7. The packet forwarding system according to claim 1, wherein the first packet forwarding device makes a transition to the second operation mode in accordance with decrease of amount of data that should be forwarded by the redundancy group while performing the master operation.

8. The packet forwarding system according to claim 1, wherein the first packet forwarding device makes a transition to the first operation mode or the master operation in accordance with increase of amount of data that should be forwarded by the redundancy group while performing the second operation mode.

9. The packet forwarding system according to claim 1, wherein
the redundancy group comprises first and second redundancy groups,
the first packet forwarding device is configured to perform the master operation in preference to the another packet forwarding device in the first redundancy group, and the another packet forwarding device is configured to perform the master operation in preference to the first packet forwarding device in the second redundancy group, and
the first packet forwarding device makes a transition to the first operation mode or the master operation in accordance with increase of amount of data that should be forwarded by the first and second redundancy groups in the second operation mode, so as to start load distribution with the another packet forwarding device.

10. The packet forwarding system according to claim 1, wherein the proxy device controls the first packet forwarding device to start the master operation upon detecting occurrence of abnormality of the another packet forwarding device in the master operation while the first packet forwarding device is in the second operation mode.

11. The packet forwarding system according to claim 1, wherein the proxy device instructs the first packet forwarding device to make a transition to the first operation mode in accordance with interruption of continuous reception of the control packet while the first packet forwarding device is in the second operation mode.

12. A proxy device comprising:
a communication unit that is connected to a network that can reach first and second packet forwarding devices, the first and second packet forwarding devices forming a redundancy group and switching a master operation and a backup operation in a complementary manner; and
a proxy monitoring unit that monitors a control packet transmitted from the second packet forwarding device that performs the master operation regarding the redundancy group through the communication unit, the proxy monitoring unit further controlling switching between first and second operation modes of the first packet forwarding device based on the monitoring,
wherein the first operation mode is a normal mode in which the first packet forwarding device monitors the control packet transmitted from the second packet forwarding device in the backup operation,
the second operation mode is a power saving mode in which the first packet forwarding device does not monitor the control packet transmitted from the second packet forwarding device in the backup operation,
the proxy monitoring unit is configured to stop monitoring the control packet transmitted from the second packet forwarding device when the first packet forwarding device is in the first operation mode, and to monitor the control packet transmitted from the second packet forwarding device on behalf of the first packet forwarding device when the first packet forwarding device is in the second operation mode, and
the redundancy group excludes the proxy device in the first and second operation modes.

13. The proxy device according to claim 12, wherein the proxy device is arranged in a communication device that does not belong to the redundancy group but performs data forwarding processing in a lower layer than the first and second packet forwarding devices.

14. The proxy device according to claim 12, wherein the proxy monitoring unit judges whether a predetermined time has come, and instructs the first packet forwarding device to switch the operation mode according to the judgment.

15. The proxy device according to claim 12, wherein the proxy monitoring unit makes a judgment regarding amount of data that should be forwarded by the proxy group, and instructs the first packet forwarding device to switch the operation mode according to the judgment.

16. The proxy device according to claim 12, wherein the proxy monitoring unit controls the first packet forwarding device to start the master operation upon detecting occurrence of abnormality in the second packet forwarding device in the master operation based on monitoring of the control packet while the first packet forwarding device is in the second operation mode.

17. The proxy device according to claim 12, wherein the proxy monitoring unit instructs the first packet forwarding device to make a transition to the first operation mode in accordance with interruption of continuous reception of the control packet while the first packet forwarding device is in the second operation mode.

18. A non-transitory computer readable medium that stores a program that, when executed by a computer, causes the computer to execute control processing method, wherein
the computer comprises a communication unit that is connected to a network that can reach first and second packet forwarding devices, the first and second packet forwarding devices forming a redundancy group and switching master operation and backup operation in a complementary manner, and
the control processing method comprises:
monitoring, by a proxy device, a control packet transmitted regarding the redundancy group from the second packet forwarding device that performs the master operation through the communication unit; and controlling, by the proxy device, switching of the first packet forwarding device between first and second operation modes based on the monitoring, wherein the first operation mode is a normal mode in which the first packet forwarding device monitors the control packet transmitted from the second packet forwarding device in the backup operation, the second operation mode is a power saving mode in which the first packet forwarding device does not monitor the control packet transmitted from the second packet forwarding device in the backup operation, the monitoring the control packet transmitted from the second packet forwarding device is stopped when the first packet forwarding device is in the first operation mode, and is performed on behalf of the first packet forwarding device when the first packet forwarding device is in the second operation mode, and the redundancy group excludes the proxy device in the first and second operation modes.

19. A control method of first and second packet forwarding devices that form a redundancy group and switch master operation and backup operation in a complementary manner, the control method comprising:

monitoring, by a proxy device, a control packet transmitted from the second packet forwarding device that performs the master operation regarding the redundancy group; and controlling, by the proxy device, switching of the first packet forwarding device between first and second operation modes based on the monitoring, wherein the first operation mode is a normal mode in which the first packet forwarding device monitors the control packet transmitted from the second packet forwarding device in the backup operation, the second operation mode is a power saving mode in which the first packet forwarding device does not monitor the control packet transmitted from the second packet forwarding device in the backup operation, the monitoring the control packet transmitted from the second packet forwarding device is stopped when the first packet forwarding device is in the first operation mode, and is performed on behalf of the first packet forwarding device when the first packet forwarding device is in the second operation mode, and the redundancy group excludes the proxy device in the first and second operation modes.

* * * * *